US009735906B2

(12) United States Patent
Sugahara et al.

(10) Patent No.: US 9,735,906 B2
(45) Date of Patent: Aug. 15, 2017

(54) DEMULTIPLEXING DEVICE AND MULTIPLEXING DEVICE

(71) Applicant: FUJITSU LIMITED, Kawasaki-shi, Kanagawa (JP)

(72) Inventors: Masao Sugahara, Suita (JP); Kenji Fukunaga, Kobe (JP); Koji Komatsu, Nishinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 14/801,361

(22) Filed: Jul. 16, 2015

(65) Prior Publication Data

US 2016/0050042 A1  Feb. 18, 2016

(30) Foreign Application Priority Data

Aug. 15, 2014  (JP) ................. 2014-165561

(51) Int. Cl.
*H04J 14/00* (2006.01)
*H04J 3/16* (2006.01)
*H04J 3/12* (2006.01)
*H04J 3/04* (2006.01)

(52) U.S. Cl.
CPC ............. *H04J 3/1652* (2013.01); *H04J 3/12* (2013.01); *H04J 3/047* (2013.01); *H04J 2203/0089* (2013.01)

(58) Field of Classification Search
None
See application file for complete search history.

(56) References Cited

U.S. PATENT DOCUMENTS

| 5,157,654 | A | * | 10/1992 | Cisneros | ............. | H04L 12/5601 370/414 |
| 5,835,496 | A | * | 11/1998 | Yeung | ............. | H04J 3/0632 370/514 |
| 6,297,677 | B1 | * | 10/2001 | Ang | ............. | H03K 19/00384 327/170 |
| 6,539,064 | B1 | * | 3/2003 | Ellis | ............. | H04L 27/2017 332/108 |
| 6,993,017 | B1 | * | 1/2006 | Danielson | ............. | H04Q 3/52 370/369 |
| 7,095,959 | B2 | * | 8/2006 | LoCascio | ............. | B82Y 5/00 385/16 |
| 2011/0170864 | A1 | | 7/2011 | Tani et al. | | |

FOREIGN PATENT DOCUMENTS

| JP | 2011-146917 | 7/2011 |
| JP | 2011-176750 | 9/2011 |

* cited by examiner

*Primary Examiner* — Tesfaldet Bocure
(74) *Attorney, Agent, or Firm* — Staas & Halsey LLP

(57) ABSTRACT

A demultiplexing device includes a first demultiplexer configured to demultiplex a first input signal, a second demultiplexer configured to demultiplex a second input signal, and a switching circuit configured to set an input destination of signals demultiplexed and output by each of the first demultiplexer and the second demultiplexer based on data rates of the first and second input signals. A multiplexing device includes a first multiplexer configured to multiplex a first input signal, a second multiplexer configured to multiplex a second input signal, and a switching circuit configured to set an input destination of signals multiplexed and output by the first multiplexer and the second multiplexer based on data rates of the first and second input signals.

5 Claims, 18 Drawing Sheets

FIG. 6A

| TS NUMBER | FRAME TYPE | MSI VALUE | TS NUMBER | FRAME TYPE | MSI VALUE |
|---|---|---|---|---|---|
| 1 | 10 G | 1 | 41 | | |
| 2 | 10 G | 2 | 42 | | |
| 3 | 10 G | 1 | 43 | | |
| 4 | 10 G | 2 | 44 | | |
| 5 | 10 G | 1 | 45 | | |
| 6 | 10 G | 2 | 46 | | |
| 7 | 10 G | 1 | 47 | | |
| 8 | 10 G | 2 | 48 | | |
| 9 | 10 G | 1 | 49 | | |
| 10 | 10 G | 2 | 50 | | |
| 11 | 10 G | 1 | 51 | | |
| 12 | 10 G | 2 | 52 | | |
| 13 | 10 G | 1 | 53 | | |
| 14 | 10 G | 2 | 54 | | |
| 15 | 10 G | 1 | 55 | | |
| 16 | 10 G | 2 | 56 | | |
| 17 | | | 57 | | |
| 18 | | | 58 | | |
| 19 | | | 59 | | |
| 20 | | | 60 | | |
| 21 | | | 61 | | |
| 22 | | | 62 | | |
| 23 | | | 63 | | |
| 24 | | | 64 | | |
| 25 | | | 65 | | |
| 26 | | | 66 | | |
| 27 | | | 67 | | |
| 28 | | | 68 | | |
| 29 | | | 69 | | |
| 30 | | | 70 | | |
| 31 | | | 71 | | |
| 32 | | | 72 | | |
| 33 | | | 73 | | |
| 34 | | | 74 | | |
| 35 | | | 75 | | |
| 36 | | | 76 | | |
| 37 | | | 77 | | |
| 38 | | | 78 | | |
| 39 | | | 79 | | |
| 40 | | | 80 | | |

FIG. 6B

| TS NUMBER | FRAME TYPE | MSI VALUE |
|---|---|---|
| 1 | 10 G | 1 |
| 3 | 10 G | 1 |
| 5 | 10 G | 1 |
| 7 | 10 G | 1 |
| 9 | 10 G | 1 |
| 11 | 10 G | 1 |
| 13 | 10 G | 1 |
| 15 | 10 G | 1 |
| 2 | 10 G | 2 |
| 4 | 10 G | 2 |
| 6 | 10 G | 2 |
| 8 | 10 G | 2 |
| 10 | 10 G | 2 |
| 12 | 10 G | 2 |
| 14 | 10 G | 2 |
| 16 | 10 G | 2 |

FIG. 6C

|  | INPUT TERMINAL | SW | OUTPUT TERMINAL |
|---|---|---|---|
| TS1 | 1 | ⇒ | 1 |
| TS2 | 2 | ⇒ | 9 |
| TS3 | 3 | ⇒ | 2 |
| TS4 | 4 | ⇒ | 10 |
| TS5 | 5 | ⇒ | 3 |
| TS6 | 6 | ⇒ | 11 |
| TS7 | 7 | ⇒ | 4 |
| TS8 | 8 | ⇒ | 12 |
| TS9 | 9 | ⇒ | 5 |
| TS10 | 10 | ⇒ | 13 |
| TS11 | 11 | ⇒ | 6 |
| TS12 | 12 | ⇒ | 14 |
| TS13 | 13 | ⇒ | 7 |
| TS14 | 14 | ⇒ | 15 |
| TS15 | 15 | ⇒ | 8 |
| TS16 | 16 | ⇒ | 16 |

FIG. 7A

| TS NUMBER | FRAME TYPE | MSI VALUE | TS NUMBER | FRAME TYPE | MSI VALUE |
|---|---|---|---|---|---|
| 1 | 10 G | 1 | 41 | 10 G | 1 |
| 2 | | | 42 | | |
| 3 | 10 G | 1 | 43 | 10 G | 1 |
| 4 | | | 44 | | |
| 5 | 10 G | 1 | 45 | 10 G | 1 |
| 6 | | | 46 | | |
| 7 | 10 G | 1 | 47 | 10 G | 1 |
| 8 | | | 48 | | |
| 9 | 10 G | 1 | 49 | 10 G | 1 |
| 10 | | | 50 | | |
| 11 | 10 G | 1 | 51 | 10 G | 1 |
| 12 | | | 52 | | |
| 13 | 10 G | 1 | 53 | 10 G | 1 |
| 14 | | | 54 | | |
| 15 | 10 G | 1 | 55 | 10 G | 1 |
| 16 | | | 56 | | |
| 17 | 10 G | 1 | 57 | 10 G | 1 |
| 18 | | | 58 | | |
| 19 | 10 G | 1 | 59 | 10 G | 1 |
| 20 | | | 60 | | |
| 21 | 10 G | 1 | 61 | 10 G | 1 |
| 22 | | | 62 | | |
| 23 | 10 G | 1 | 63 | 10 G | 1 |
| 24 | | | 64 | | |
| 25 | 10 G | 1 | 65 | | |
| 26 | | | 66 | | |
| 27 | 10 G | 1 | 67 | | |
| 28 | | | 68 | | |
| 29 | 10 G | 1 | 69 | | |
| 30 | | | 70 | | |
| 31 | 10 G | 1 | 71 | | |
| 32 | | | 72 | | |
| 33 | 10 G | 1 | 73 | | |
| 34 | | | 74 | | |
| 35 | 10 G | 1 | 75 | | |
| 36 | | | 76 | | |
| 37 | 10 G | 1 | 77 | | |
| 38 | | | 78 | | |
| 39 | 10 G | 1 | 79 | | |
| 40 | | | 80 | | |

FIG. 7B

| TS NUMBER | FRAME TYPE | MSI VALUE |
|---|---|---|
| 1 | 10 G | 1 |
| 3 | 10 G | 1 |
| 5 | 10 G | 1 |
| 7 | 10 G | 1 |
| 9 | 10 G | 1 |
| 11 | 10 G | 1 |
| 13 | 10 G | 1 |
| 15 | 10 G | 1 |
| 17 | 10 G | 1 |
| 19 | 10 G | 1 |
| 21 | 10 G | 1 |
| 23 | 10 G | 1 |
| 25 | 10 G | 1 |
| 27 | 10 G | 1 |
| 29 | 10 G | 1 |
| 31 | 10 G | 1 |
| 33 | 10 G | 1 |
| 35 | 10 G | 1 |
| 37 | 10 G | 1 |
| 39 | 10 G | 1 |
| 41 | 10 G | 1 |
| 43 | 10 G | 1 |
| 45 | 10 G | 1 |
| 47 | 10 G | 1 |
| 49 | 10 G | 1 |
| 51 | 10 G | 1 |
| 53 | 10 G | 1 |
| 55 | 10 G | 1 |
| 57 | 10 G | 1 |
| 59 | 10 G | 1 |
| 61 | 10 G | 1 |
| 63 | 10 G | 1 |

DEMULTIPLEXING DEVICE AND MULTIPLEXING DEVICE

CROSS-REFERENCE TO RELATED APPLICATION

This application is based upon and claims the benefit of priority of the prior Japanese Patent Application No. 2014-165561, filed on Aug. 15, 2014, the entire contents of which are incorporated herein by reference.

FIELD

The present embodiments relate to a demultiplexing device, and a multiplexing device.

BACKGROUND

With construction of a large-scale network in recent years, there is a demand for high capacity and high speed of data transmission processing. As a standard of a high speed digital transmission scheme for constructing such a network, there is an optical transport network (OTN) defined in Recommendation G.709 Standard of the International Telecommunication Union Telecommunication Standardization Sector (ITU-T). The OTN transmission scheme defines an optical channel transport unit (OTU) which enables multiple kinds of client signals of different transmission rates to be multiplexed to one signal in a time dividing manner. The OTU is capable of storing multiple kinds of optical-channel data units (ODUs).

As multiple kinds of ODUs, for example, client signals of up to about 1.25 Gbps can be stored in ODU 0, and client signals of up to about 2.5 Gbps can be stored in ODU 1. Also, client signals of up to about 10 Gbps can be stored in ODU 2, client signals of up to about 40 Gbps can be stored in ODU 3, and client signals of up to about 100 Gbps can be stored in ODU 4.

ODU is capable of storing a lower-level ODU. For example, ODU 4 is capable of storing ODU 0, ODU 1, ODU 2, and ODU 3, and ODU 3 is capable of storing ODU 0, ODU 1, and ODU 2. Furthermore, ODU employs a multi-stage scheme capable of storing lower-level ODUs in a nesting structure in which ODUs are combined in multiple stages. An ODU storing a lower-level ODU is defined as HO (High Order)-ODU, and an ODU not storing a lower-level ODU is defined as LO (Low Order)-ODU.

A demultiplexing device in a transmission apparatus compliant with the OTN demultiplexes HO-ODU in OTU to data of LO-ODU. FIG. 14 is an illustrative diagram illustrating an example of a demultiplexing device in a transmission apparatus. ODU 0 corresponds to a 1 G frame, ODU 2 corresponds to a 10 G frame, ODU 3 corresponds to a 40 G frame, and ODU 4 corresponds to a 100 G frame.

A demultiplexing device 100 illustrated in FIG. 14 includes one 100 G processor 111, two 40 G processors 112, eighteen 10 G processors 113, two hundred and eighty-eight 1 G processors 114, and a SW 115.

The 100 G processor 111 is configured to extract, for example, a multiplex structure identifier (MSI) value indicating a mapping configuration in the 100 G frame when the 100 G frame (ODU 4) is inputted from a 100 G input interface 101A. The 100 G frame includes 80 tributary slots (TS) in the unit of TS. The 100 G processor 111 demultiplexes the 100 G frame to low speed frames based on the extracted MSI value. The low speed frames demultiplexed from the 100 G frame corresponds to, for example, a 40 G frame (ODU 3), a 10 G frame (ODU 2), or a 1 G frame (ODU 0).

Each 40 G processor 112 extracts a MSI value from the 40 G frame when the 40 G frame (ODU 3) is inputted from the 40 G input interface 101B or from the 100 G processor 111. The 40 G frame includes 32 TS. The 40 G processor 112 demultiplexes the 40 G frame to low speed frames based on the extracted MSI value. The low speed frames demultiplexed from the 40 G frame each correspond to, for example, a 10 G frame, or a 1 G frame.

The 10 G processor 113 includes eight 10 G processors 113A, and ten 10 G processors 113B. The 10 G processor 113A extracts the MSI value from the 10 G frame when the 10 G frame (ODU 2) is inputted from the 40 G processor 112. The 10 G frame includes 8 TS. The 10 G processor 113A demultiplexes the 10 G frame to 1 G frames based on the extracted MSI value. The 10 G processor 113B extracts the MSI value from the 10 G frame when the 10 G frame is inputted from the 100 G processor 111 or from the 10 G input interface 101C. The 10 G processor 113B demultiplexes the 10 G frame to 1 G frames based on the extracted MSI value.

The 1 G processor 114 includes sixty-four 1 G processors 114A, sixty-four 1 G processors 114B, eighty 1 G processors 114C, and eighty 1 G processors 114D. The 1 G processor 114A acquires a client signal from the 1 G frame when the 1 G frame is inputted from the 10 G processor 113A. The 1 G processor 114B acquires the client signal from the 40 G frame when the 40 G frame is inputted from the 40 G processor 112. The 1 G processor 114C acquires the client signal from the 1 G frame when the 1 G frame is inputted from the 10 G processor 113B. The 1 G processor 114D acquires the client signal from the 1 G frame when the 1 G frame is inputted from the 100 G processor 111. The SW 115 is a switch configured to output an output signal of the 100 G processor 111, the 40 G processor 112, the 10 G processor 113, or the 1 G processor 114 to output stages by switching them in a predetermined unit.

The demultiplexing device 100 is capable of demultiplexing, for example, the 100 G frame from the 100 G input interface 101A to a client signal via the 100 G processor 111, 40 G processor 112, 10 G processor 113A, and 1 G processor 114A, and outputting the client signal through the SW 115.

The related technique is disclosed by Japanese Laid-open Patent Publication No. 2011-146917, for example.

SUMMARY

According to an aspect of the invention, a demultiplexing device includes: a first demultiplexer configured to demultiplex a first input signal; a second demultiplexer configured to demultiplex a second input signal; and a switching unit configured to set an input destination of signals demultiplexed by each of the first demultiplexer and the second demultiplexer to one of the first demultiplexer and the second demultiplexer, based on a configuration of each of the first input signal and the second input signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A is an illustrative diagram illustrating an example of a TS number sorting operation on a 100 G reception-side PSW;

FIG. 6B is an illustrative diagram illustrating an example of a TS number sorting operation of a 100 G reception-side PSW;

FIG. 6C is an illustrative diagram illustrating an example of a TS number sorting operation of a 100 G reception-side PSW;

FIG. 7A is an illustrative diagram illustrating an example of a TS number sorting operation of a 100 G reception-side PSW;

FIG. 7B is an illustrative diagram illustrating an example of a TS number sorting operation of a 100 G reception-side PSW;

DESCRIPTION OF EMBODIMENTS

Figure 14:
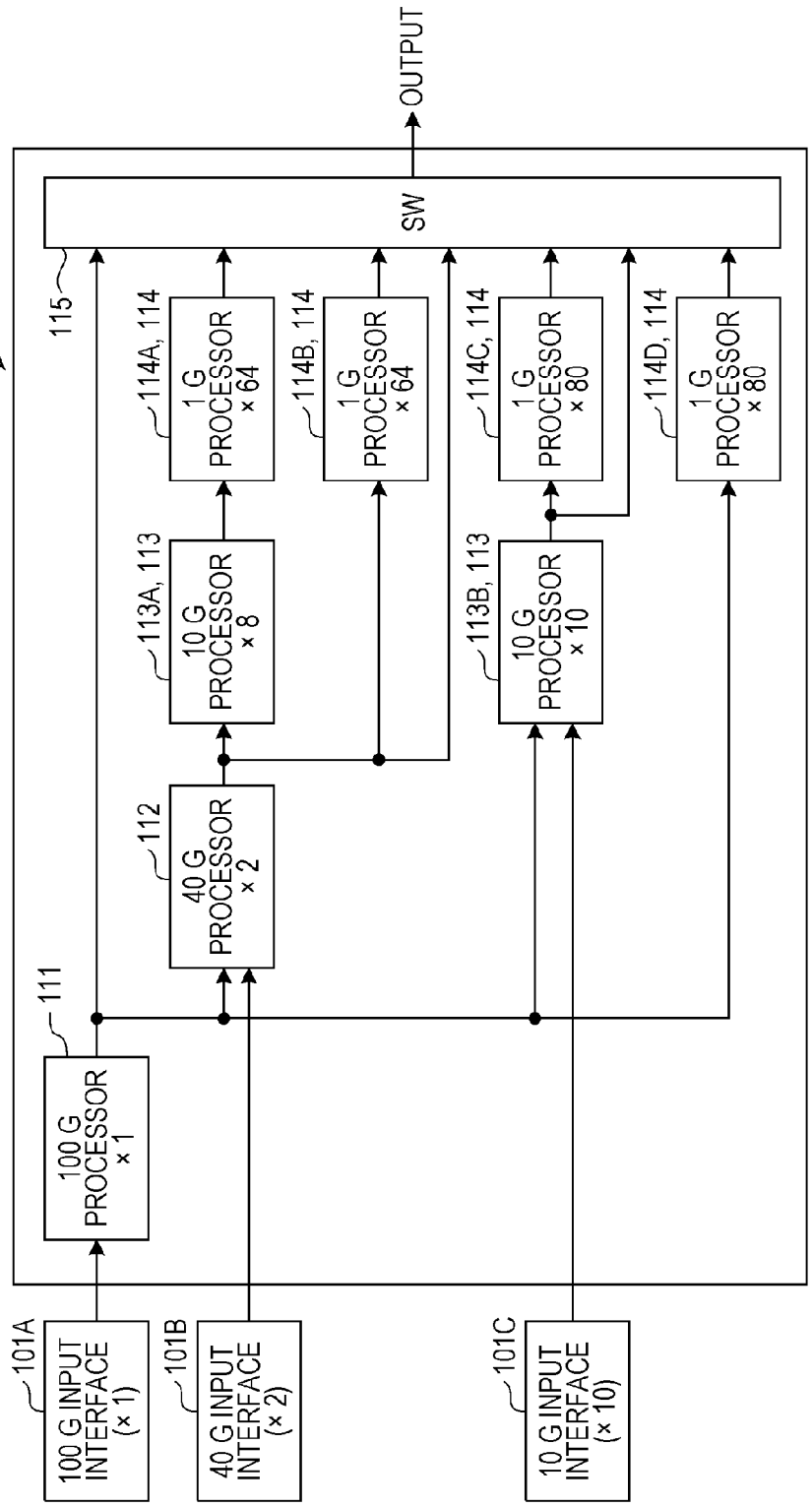
FIG. 14 is an illustrative diagram illustrating an example of a demultiplexing device in a transmission apparatus.

Considering a combination pattern of multiple kinds of ODUs which can be stored in a 100 G frame, a demultiplexing device 100 of FIG. 14 includes, for example, a 100 G processor 111 including two 40 G processors 112, ten 10 G processors 113B, and eighty 1 G processors 114D. Further, in the demultiplexing device 100, for example, the 40 G processors 112 include eight 10 G processors 113A and sixty-four 1 G processors 114B, the 10 G processors 113A include sixty-four 1 G processors 114A, and the 10 G processors 113B include eighty 1 G processors 114C.

In summary, the demultiplexing device 100 includes one 100 G processor 111, two 40 G processors 112, eighteen 10 G processors 113, and two hundred and eighty-eight 1 G processors 114. Thus, the number of unused processors such as, for example, the 40 G processors 112, the 10 G processors 113, and the 1 G processors 114 increases. The circuit scale is increased by an amount corresponding to the unused processors, and thereby power consumption is increased. Not only the demultiplexing device 100 in the transmission apparatus described above, a multiplexing device in the transmission apparatus also includes processors each including lower-level processors depending on a combination pattern of multiple kinds of ODUs, which increases the circuit scale and power consumption.

Hereinafter, a technique related to a demultiplexing device and a multiplexing device for reducing power consumption by reducing the circuit scale is described in detail with reference to the accompanying drawings. However, the disclosed technique is not limited to the embodiments. The embodiments described below may be combined together as appropriate within a scope not causing inconsistency with the appended claims.

Embodiment

Figure 1:
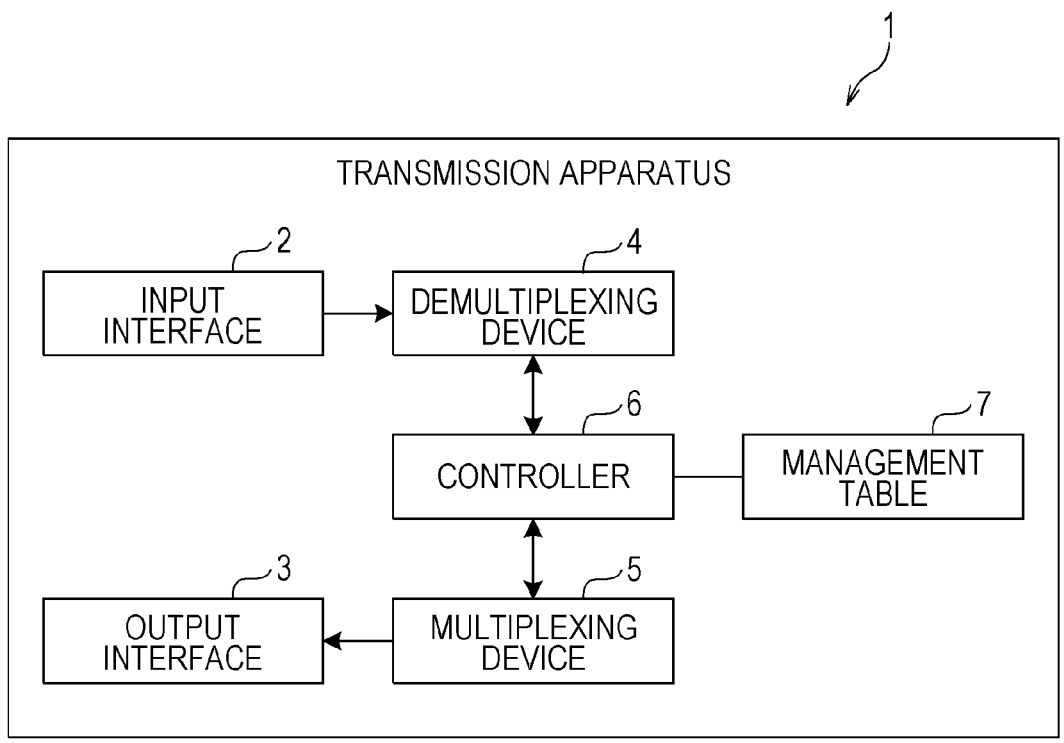
FIG. 1 is an illustrative diagram illustrating an example of a transmission apparatus according to the present embodiment.
Figure 2:
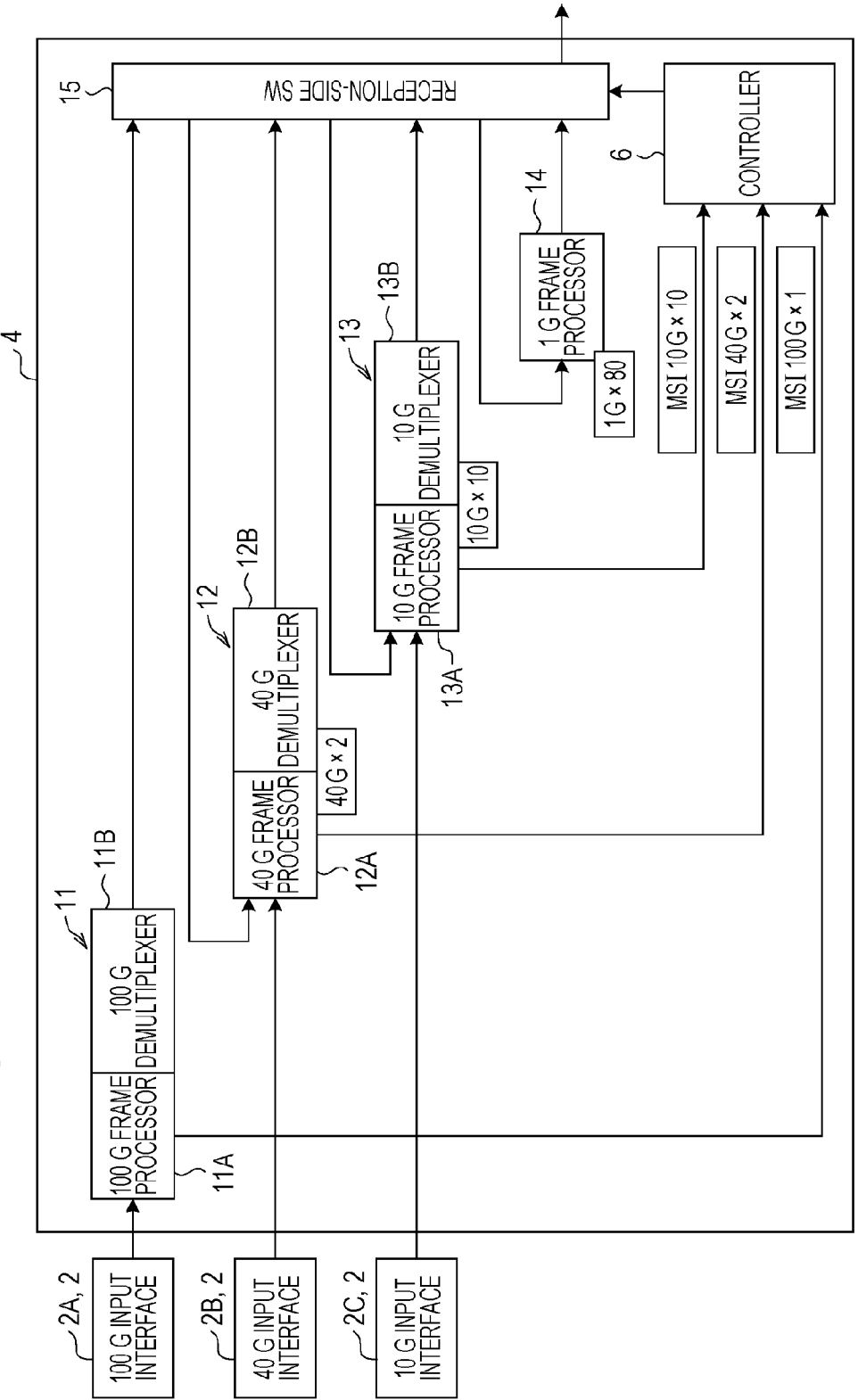
FIG. 2 is an illustrative diagram illustrating an example of a demultiplexing device in the transmission apparatus.
Figure 4:
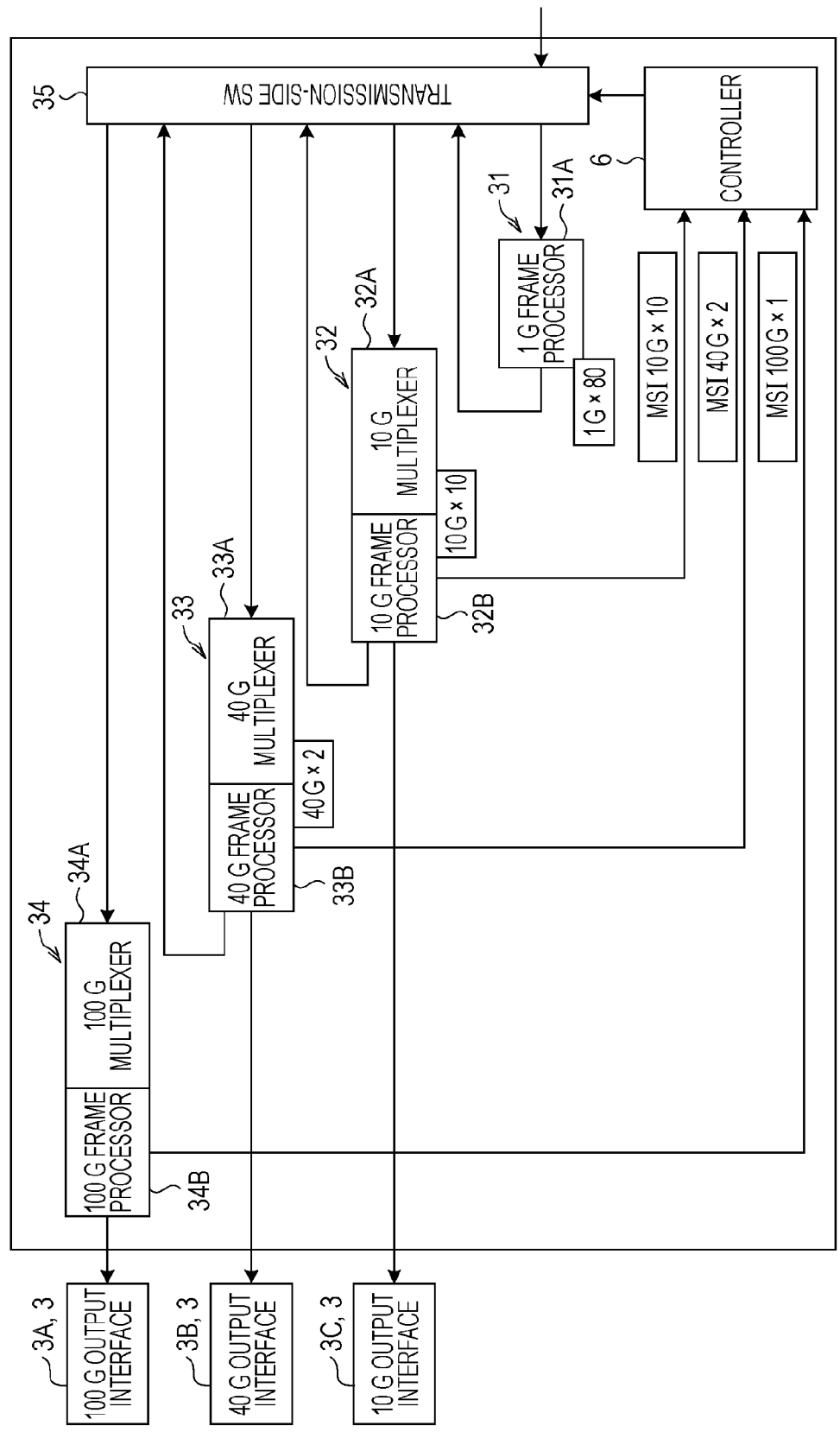
FIG. 4 is an illustrative diagram illustrating an example of a multiplexing device in the transmission apparatus.

FIG. 1 is an illustrative diagram illustrating an example of a transmission apparatus according to the embodiment. FIG. 2 is an illustrative diagram illustrating an example of a demultiplexing device in the transmission apparatus. FIG. 4 is an illustrative diagram illustrating an example of a multiplexing device in the transmission apparatus. A transmission apparatus 1 illustrated in FIG. 1 is, for example, an optical wavelength demultiplexing/multiplexing device connected to the OTN. The transmission apparatus 1 includes an input interface 2, an output interface 3, a demultiplexing device 4, a multiplexing device 5, a controller 6, and a management table 7.

The input interface 2 illustrated in FIG. 2 corresponds to an input interface between the transmission apparatus 1 and the OTN, and includes one 100 G input interface 2A, two (#1 and #2) 40 G input interfaces 2B, and ten (#1 to #10) 10 G input interfaces 2C. The 100 G input interface 2A is an interface configured to input a 100 G frame (ODU 4). Each of 40 G input interfaces 2B is an interface configured to input a 40 G frame (ODU 3). Each of 10 G input interfaces 2C is an interface configured to input a 10 G frame (ODU 2).

The output interface 3 illustrated in FIG. 4 corresponds to an output interface between the transmission apparatus 1 and the OTN, and includes one 100 G output interface 3A, two (#1 and #2) 40 G output interfaces 3B, and ten (#1 to #10) 10 G output interfaces 3C. The 100 G output interface 3A is an interface configured to output a 100 G frame (ODU 4). Each of 40 G output interfaces 3B is an interface configured to output a 40 G frame (ODU 3). Each of 10 G output interfaces 3C is an interface configured to output a 10 G frame (ODU 2).

The demultiplexing device 4 demultiplexes, to a lower-level low speed frame, a high speed frame inputted from the input interface 2, and demultiplexes the low speed frame to data in a unit of tributary slot (TS). The multiplexing device 5 is configured to store data in the unit of TS into the low speed frame, generate a high speed frame by multiplexing stored multiple low speed frames, and output the generated high speed frame to the output interface 3. The controller 6 is configured to control a whole of the transmission apparatus 1. The management table 7 is configured to register and manage TS number sorting information for each of multiplex structure identifier (MSI) values described later.

A demultiplexing device 4 illustrated in FIG. 2 includes one 100 G processor 11, two (#1 and #2) 40 G processors 12, ten (#1 to #10) 10 G processors 13, eighty (#1 to #80) 1 G processors 14, and a reception-side SW 15.

The 100 G processor 11 is a frame processor connected to the 100 G input interface 2A, the frame processor being configured to demultiplex, to a low speed frame such as, for example, the 40 G frame, 10 G frame, and 1 G frame, the 100 G frame inputted from the 100 G input interface 2A. The 100 G processor 11 is, for example, a first demultiplexer. The 40 G processor 12 is a frame processor connected to the 40 G input interface 2B, the frame processor being configured to demultiplex, to a low speed frame such as, for example, the 10 G frame, and 1 G frame, the 40 G frame inputted from the 40 G input interface 2B. The 40 G processor 12 is, for example, a second demultiplexer. The 10 G processor 13 is a frame processor connected to the 10 G input interface 2C, the frame processor being configured to demultiplex, for example, to a 1 G frame, the 10 G frame inputted from the 10 G input interface 2C. The 10 G processor 13 is, for example, a third demultiplexer. The 1 G processor 14 acquires a client signal from the 1 G frame.

The reception-side SW 15 is, for example, a switching unit configured to switch over signals from a 100 G processor 11, two 40 G processors 12, ten 10 G processors 13, and eighty 1 G processors 14 in a predetermined unit in response to a control signal from the controller 6. The reception-side SW 15 enables connection of, for example, a path between the 100 G processor 11 and each of 40 G processors 12, a path between the 100 G processor 11 and each of 10 G processors 13, and a path between the 100 G processor 11 and each of 1 G processors 14. Further, the reception-side SW 15 enables connection of, for example, a path between each of 40 G processors 12 and each of 10 G processors 13, a path between each of 40 G processors 12 and each of 1 G processors 14, and a path between each of 10 G processors 13 and each of 1 G processors 14.

The 100 G processor 11 includes a 100 G frame processor 11A, and a 100 G demultiplexer 11B. The 100 G frame processor 11A performs a frame processing for the 100 G frame, extracts a MSI value from an overhead (OH) in the 100 G frame, and notifies the extracted MSI value to the controller 6. The 100 G demultiplexer 11B demultiplexes a payload in the 100 G frame to low speed frames based on the extracted MSI value of the 100 G frame.

Each of 40 G processors 12 includes a 40 G frame processor 12A, and a 40 G demultiplexer 12B. The 40 G frame processor 12A performs a frame processing for the 40 G frame, extracts a MSI value from the OH in the 40 G frame, and notifies the extracted MSI value to the controller 6. The 40 G demultiplexer 12B demultiplexes a payload in the 40 G frame to low speed frames based on the extracted MSI value of the 40 G frame.

Each of 10 G processors 13 includes a 10 G frame processor 13A, and a 10 G demultiplexer 13B. The 10 G frame processor 13A performs a frame processing for the 10 G frame, extracts a MSI value from the OH in the 10 G frame, and notifies the extracted MSI value to the controller 6. The 10 G demultiplexer 13B demultiplexes the 10 G frame to 1 G frames based on the extracted MSI value of the 10 G frame. Each of 1 G processors 14 includes a 1 G frame processor 14A. The 1 G frame processor 14A performs a frame processing for the 1 G frame, and acquires a client signal.

The controller 6 is configured to acquire the MSI value from the 100 G frame processor 11A, the 40 G frame processor 12A, and the 10 G frame processor 13A, and control the reception-side SW 15 based on the acquired MSI value. Based on the MSI value, the controller 6 classifies, for example, each of TS out of 80 TS for each group of MSI values. That is, based on the MSI value, the controller 6 identifies the number of TS for each of frame types such as, for example, the 40 G frame (32 TS) and the 10 G frame (8 TS), out of 80 TS.

Figure 3:
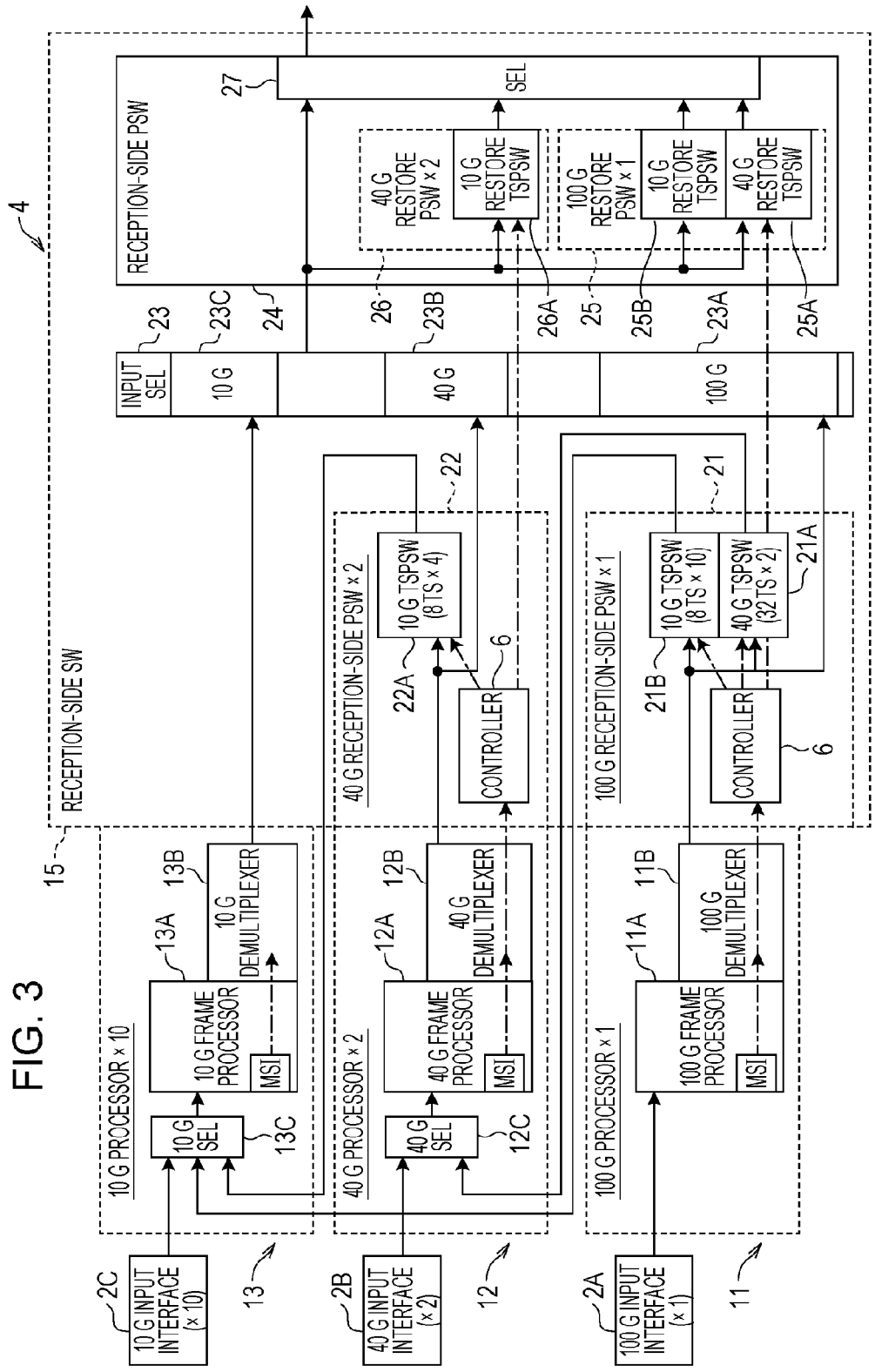
FIG. 3 is an illustrative diagram illustrating an example of a detailed configuration in the demultiplexing device.

FIG. 3 is an illustrative diagram illustrating an example of a detailed configuration in the demultiplexing device 4. The reception-side SW 15 illustrated in FIG. 3 includes one 100 G reception-side PSW 21, two (#1 and #2) 40 G reception-side PSWs 22, an input SEL 23, and a reception-side PSW 24.

The 100 G reception-side PSW 21 is a path switch connected to the 100 G demultiplexer 11B in the 100 G processor 11, the path switch being configured to forward the 40 G frame in the 100 G frame to the 40 G processor 12, and forward the 10 G frame in the 100 G frame to the 10 G processor 13. The 100 G reception-side PSW 21 is configured to sort TS numbers of the 40 G frame or the 10 G frame demultiplexed by the 100 G demultiplexer 11B in ascending order within a group of the same MSI value. The 100 G reception-side PSW 21 includes two (#1 and #2) 40 G TSPSWs 21A, and ten (#1 to #10) 10 G TSPSWs 21B.

Each of 40 G TSPSWs 21A is a switch for connecting a path between the 100 G processor 11 and the 40 G processor 12 to forward the 40 G frame in the 100 G frame to each of 40 G processors 12. The 40 G TSPSW 21A sorts TS numbers in the 40 G frame in the ascending order for each of 40 G frames within a group of the same MSI value. The 40 G frame includes 32 TS. A sorted TS number becomes, for example, an input TS number of the 40 G processor 12 which is a forwarding destination. The controller 6 identifies the 40 G frame (32 TS) from 80 TS based on the MSI value of the 100 G frame, and extracts the TS number of the 40 G frame having the same MSI value. Then, the controller 6 registers, in the management table 7, sorting information of TS numbers within the group of the same MSI value sorted in the ascending order. The sorting information is connection information for managing TS numbers sorted for each of MSI values, and connecting to a low order nG processor corresponding to the MSI value. The controller 6 sets a TS number in the 40 G frame to the 40 G TSPSW 21A based on the sorting information in the management table 7. Thus, each of 40 G TSPSWs 21A can output 40 G frames of the same MSI value to each of 40 G processors 12 in a unit of 32 TS.

Each of 10 G TSPSWs 21B is a switch for connecting a path between the 100 G processor 11 and the 10 G processor 13 to forward the 10 G frame in the 100 G frame to each of 10 G processors 13. The 10 G TSPSW 21B sorts TS numbers in the 10 G frame in the ascending order for each of 10 G frames within a group of the same MSI value. The 10 G frame includes 8 TS. A sorted TS number becomes, for example, an input TS number of the 10 G processor 13 which is a forwarding destination. The controller 6 identifies the 10 G frame (8 TS) from 80 TS based on the MSI value of the 100 G frame, and extracts TS numbers of the 10 G frame of the same MSI value. The controller 6 registers, in the management table 7, sorting information of TS numbers in the group of the same MSI value sorted in the ascending order. The controller 6 allocates a TS number in the 10 G frame to the 10 G TSPSW 21B based on the sorting information in the management table 7. Thus, each of 10 G TSPSWs 21B can output 10 G frames of the same MSI value to each of 10 G processors 13 in a unit of 8 TS.

Each of 40 G reception-side PSWs 22 is a switch for connecting to the 40 G demultiplexer 12B to forward the 10 G frame in the 40 G frame to each of 10 G processors 13. Each of 40 G reception-side PSWs 22 is configured to sort TS numbers of the 10 G frame demultiplexed by the 40 G demultiplexer 12B in the ascending order within a group of the same MSI value. Each of 40 G reception-side PSWs 22 includes four (#1 to #4) 10 G TSPSWs 22A. Each of 10 G TSPSWs 22A is a switch for connecting a path between the 40 G processor 12 and the 10 G processor 13 to forward the 10 G frame in the 40 G frame to the 10 G processor 13. The 10 G TSPSW 22A sorts TS numbers in the 10 G frame in the ascending order for each of 10 G frames within a group of the same MSI value. A sorted TS number becomes, for example, an input TS number of the 10 G processor 13 which is a forwarding destination. The controller 6 identifies the 10 G frame (8 TS) from 32 TS based on the MSI value of the 40 G frame, and extracts TS numbers of the 10 G frame of the same MSI value. The controller 6 registers, in the management table 7, sorting information of TS numbers in the group of the same MSI value sorted in the ascending order. The controller 6 allocates a TS number in the 10 G frame to the 10 G TSPSW 22A based on the sorting information in the management table 7. Thus, each of 10 G TSPSWs 22A can output the 10 G frame of the same MSI value to each of 10 G processors 13 in a unit of 8 TS.

The input SEL 23 includes a 100 G SEL 23A, a 40 G SEL 23B, and a 10 G SEL 23C. The 100 G SEL 23A is a switch for connecting to the 100 G demultiplexer 11B in the 100 G processor 11 to select the 100 G frame in a unit of TS. The 40 G SEL 23B is a switch for connecting to the 40 G demultiplexer 12B in the 40 G processor 12 to select the 40 G frame in a unit of TS. The 10 G SEL 23C is a switch for connecting to the 10 G demultiplexer 13B in the 10 G processor 13 to select the 10 G frame in a unit of TS. The input SEL 23 connects one 100 G demultiplexer 11B, two 40 G demultiplexers 12B, and ten 10 G demultiplexers 13B to each other, and selects desired data corresponding to 80 TS from output of the 100 G demultiplexer 11B, 40 G demultiplexers 12B, and 10 G demultiplexers 13B.

The reception-side PSW 24 is a switch for connecting to the input SEL 23 to restore TS numbers of data corresponding to 80 TS to TS numbers prior to sorting and output to the output stage. The reception-side PSW 24 includes one 100 G restore PSW 25, two (#1 and #2) 40 G restore PSWs 26, and a SEL 27.

The 100 G restore PSW 25 is a switch for restoring TS numbers sorted in the 100 G reception-side PSW 21 to TS numbers prior to sorting and outputting data to the SEL 27. The 100 G restore PSW 25 includes two (#1 and #2) 40 G restore TSPSWs 25A, and ten (#1 to #10) 10 G restore TSPSWs 25B. Each of 40 G restore TSPSWs 25A is a switch for restoring TS numbers of 40 G frames sorted by the 40 G TSPSW 21A for each of 40 G frames stored in the 100 G frame to TS numbers prior to sorting, and outputting data to the SEL 27. Each of 10 G restore TSPSWs 25B is a switch for restoring TS numbers of 10 G frames sorted by the 10 G TSPSW 21B for each of 10 G frames stored in the 100 G frame to TS numbers prior to sorting, and outputting data to the SEL 27.

Each of 40 G restore PSWs 26 is a switch for restoring TS numbers sorted by the 10 G TSPSW 22A in the 40 G reception-side PSW 22 to TS numbers prior to sorting, and outputting data to the SEL 27. The 40 G restore PSW 26 includes four (#1 to #4) 10 GT restore TSPSWs 26A. Each of 10 G restore TSPSWs 26A is a switch for restoring TS numbers of 10 G frames sorted by the 10 GT SPSW 22A for each of 10 G frames stored in the 40 G frame to TS numbers prior to sorting, and outputting data to the SEL 27.

The SEL 27 selects and outputs desired data corresponding to 80 TS out of data restored to TS numbers prior to sorting in the 10 G restore TSPSW 26A, the 10 G restore TSPSW 25B, and the 40 G TSPSW 25A.

Each of 40 G processors 12 includes a 40 G SEL 12C. In response to a control signal from the controller 6, the 40 G SEL 12C selects output (40 G frame) from the 40 G TSPSW 21A in the 40 G input interface 2B or the 100 G reception-side PSW 21, and outputs to the 40 G frame processor 12. When extracted a MSI value corresponding to the 40 G frame in the 100 G frame, the controller 6 controls the 40 G SEL 12C to input the 40 G frame from the 40 G TSPSW 21A to the 40 G frame processor 12A. When detected input of the 40 G frame from the 40 G input interface 2B, the controller 6 controls the 40 G SEL 12C to input the inputted 40 G frame into the 40 G frame processor 12A.

Each of 10 G processors 13 includes a 10 G SEL 13C. In response to a control signal from the controller 6, the 10 G SEL 13C selects output (10 G frame) from the 10 G input interface 2C, 10 G TSPSW 21B in the 100 G reception-side PSW 21, or the 10 G TSPSW 22A in the 40 G reception-side PSW 22, and outputs to the 10 G frame processor 13A. When extracted a MSI value of the 10 G frame in the 100 G frame, the controller 6 controls the 10 G SEL 13C to input the 10 G frame from the 10 G TSPSW 21B to the 10 G frame processor 13A. When extracted a MSI value of the 10 G frame in the 40 G frame, the controller 6 controls the 10 G SEL 13C to input the 10 G frame from the 10 G TSPSW 22A to the 10 G frame processor 13A. When detected input of the 10 G frame from the 10 G input interface 2C, the controller 6 controls the 10 G SEL 13C to input the inputted 10 G frame into the 10 G frame processor 13A.

In response to a switching operation of the reception-side SW 15, the demultiplexing device 4 enables connection among processors by switching over, in a predetermined unit, signals from one 100 G processor 11, two 40 G processors 12, ten 10 G processors 13, and eighty 1 G processors 14, and thereby reduces the number of nG processors involved in the demultiplexing to a minimum.

A multiplexing device 5 illustrated in FIG. 4 includes eighty (#1 to #80) 1 G processors 31, ten (#1 to #10) 10 G processors 32, two (#1 and #2) 40 G processors 33, one 100 G processor 34, and a transmission-side SW 35. The 10 G processor 32 is, for example, a first multiplexer. The 40 G processor 33 is, for example, a second multiplexer, and the 100 G processor 34 is, for example, a third multiplexer.

Each of 1 G processors 31 includes a 1 G frame processor 31A. Each of 10 G processors 32 includes a 10 G multiplexer 32A, and a 10 G frame processor 32B. The 10 G multiplexer 32A multiplexes 1 G frames based on the MSI value of the 10 G frame. The 10 G frame processor 32B generates the 10 G frame with low speed frames multiplexed by the 10 G multiplexer 32A based on the MSI value of the 10 G frame. The 10 G frame processor 32B outputs the 10 G frame to the transmission-side SW 35 or the 10 G output interface 3C.

Each of 40 G processors 33 includes a 40 G multiplexer 33A, and a 40 G frame processor 33B. The 40 G multiplexer 33A multiplexes the 10 G frame and the 1 G frame based on the MSI value of the 40 G frame. The 40 G frame processor 33B generates the 40 G frame with low speed frames multiplexed by the 40 G multiplexer 33A based on the MSI value of the 40 G frame. The 40 G frame processor 33B outputs the 40 G frame to the transmission-side SW 35 or the 40 G output interface 3B.

The 100 G processor 34 includes a 100 G multiplexer 34A, and a 100 G frame processor 34B. The 100 G multiplexer 34A multiplexes 40 G frames, 10 G frames or 1 G frames based on the MSI value of the 100 G frame. The 100 G frame processor 34B generates the 100 G frame with low speed frames multiplexed by the 100 G multiplexer 34A based on the MSI value of the 100 G frame. The 100 G frame processor 34B outputs the 100 G frame to the 100 G output interface 3A.

The transmission-side SW 35 is, for example, a switching unit configured to switch over signals from eighty 1 G processors 31, ten 10 G processors 32, two 40 G processors 33, and one 100 G processor 34 in a predetermined unit in response to a control signal from the controller 6. The controller 6 extracts the MSI value from the 100 G frame processor 34B, the 40 G frame processor 33B, and the 10 G frame processor 32B, and controls the transmission-side SW 35 based on the extracted MSI value. The transmission-side SW 35 enables connection of, for example, a path between the 100 G processor 34 and each of 40 G processors 33, a path between the 100 G processor 34 and each of 10 G processors 32, and a path between the 100 G processor 34 and each of 1 G processors 31. Further, the transmission-side SW 35 enables connection of, for example, a path between each of 40 G processors 33 and each of 10 G processors 32, a path between each of 40 G processors 33 and each of 1 G processors 31, and a path between each of 10 G processors 32 and each of 1 G processors 31.

Figure 5:
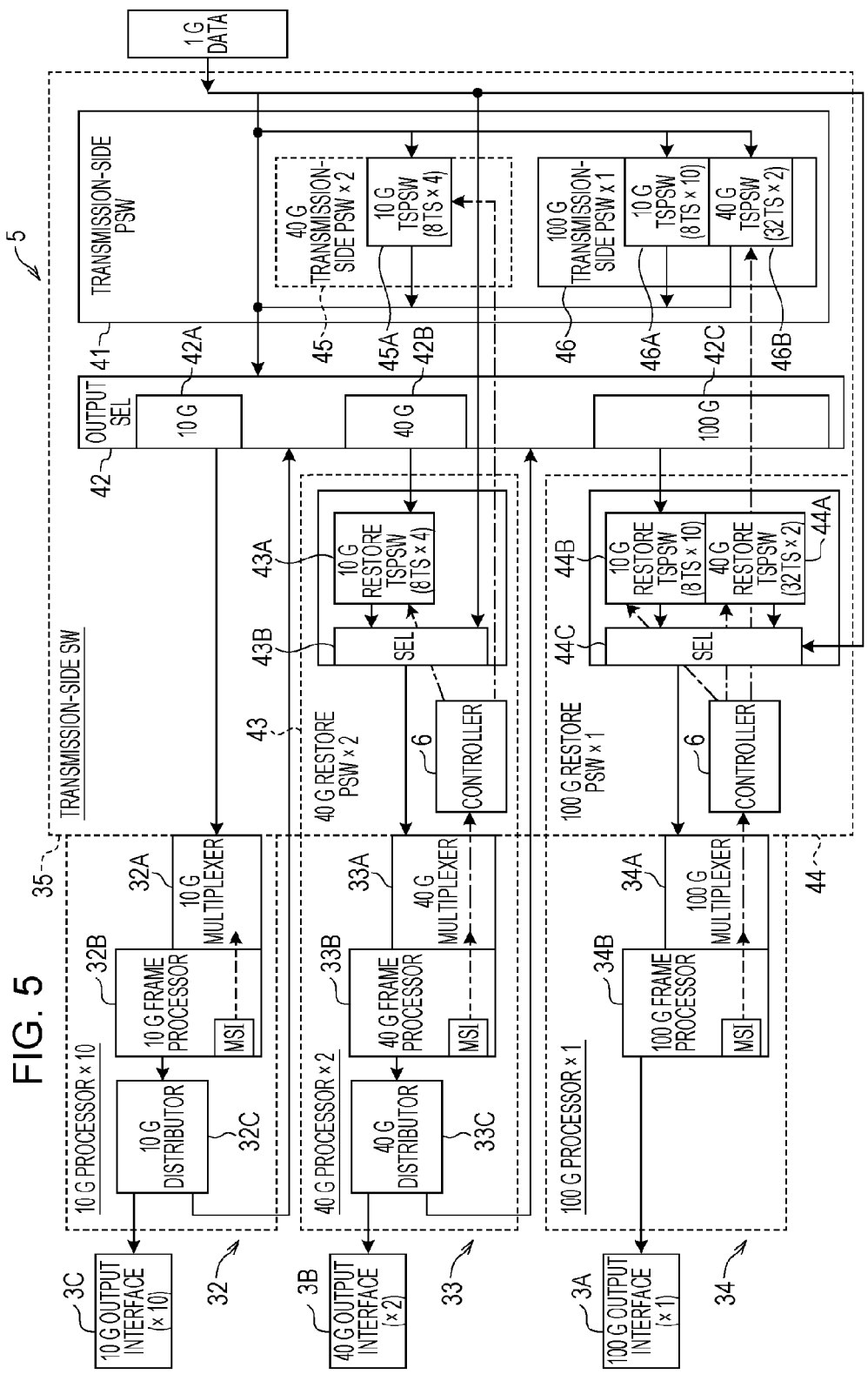
FIG. 5 is an illustrative diagram illustrating an example of a detailed configuration in the multiplexing device.

FIG. 5 is an illustrative diagram illustrating an example of a detailed configuration in the multiplexing device 5. The transmission-side SW 35 illustrated in FIG. 5 includes a transmission-side PSW 41, an output SEL 42, two (#1 and #2) 40 G restore PSW 43, and one 100 G restore PSW 44. The transmission-side PSW 41 includes two (#1 and #2) 40 G transmission-side PSWs 45, and one 100 G transmission-side PSW 46.

The 40 G transmission-side PSW 45 is a switch for connecting to the output SEL 42 to forward the 10 G frame to be stored into the 40 G frame to each of 40 G processors 33 via the 10 G processor 32. The 40 G transmission-side PSW 45 sorts TS numbers in the 10 G frame in the ascending order for each of 10 G frames within a group of the same MSI value. Each of 40 G transmission-side PSWs 45 includes four (#1 to #4) 10 G TSPSWs 45A. A sorted TS number becomes, for example, an input TS number of the 40 G processor 33 which is a forwarding destination. The controller 6 registers, in the management table 7, sorting information of TS numbers in the group of the same MSI value sorted in the ascending order. The sorting information is connection information for managing TS numbers sorted for each of MSI values, and connecting to a high order nG processor corresponding to the MSI value. The controller 6 allocates a frame to the 10 G TSPSW 45A based on the sorting information in the management table 7. Thus, each of 10 G TSPSWs 45A can output the 10 G frame of the same MSI value to the output SEL 42 in a unit of 8 TS.

The 100 G transmission-side PSW 46 is a path switch for connecting to the output SEL 42 to forward the 10 G frame to be stored into the 100 G frame to the 100 G processor 34 via the 10 G processor 32. The 100 G transmission-side PSW 46 sorts TS numbers in the 10 G frame in the ascending order for each of 10 G frames within a group of the same MSI value. The 100 G transmission-side PSW 46 includes ten (#1 to #10) 10 G TSPSWs 46A. The 10 G TSPSW 46A is a switch for connecting to the output SEL 42. A sorted TS number becomes, for example, an input TS number of the 100 G processor 34 which is a forwarding destination. The controller 6 registers, in the management table 7, sorting information of TS numbers in the group of the same MSI value sorted in the ascending order. The controller 6 allocates a frame to the 10 G TSPSW 46A based on the sorting information in the management table 7.

Further, the 100 G transmission-side PSW 46 is a switch for connecting to the output SEL 42 to forward the 40 G frame to be stored into the 100 G frame to the 100 G processor 34 via the 40 G processor 33. The 100 G transmission-side PSW 46 sorts TS numbers in the 40 G frame in the ascending order for each of 40 G frames in a group of the same MSI value. The 100 G transmission-side PSW 46 includes two (#1 to #2) 40 G TSPSWs 46B. The 40 G TSPSW 46B is a switch for connecting to the output SEL 42. A sorted TS number becomes, for example, an input TS number of the 100 G processor 34 which is a forwarding destination. The controller 6 registers, in the management table 7, sorting information of TS numbers in the group of the same MSI value sorted in the ascending order. The controller 6 allocates a frame to the 40 G TSPSW 46B based on the sorting information in the management table 7.

The output SEL 42 includes a 10 G SEL 42A, a 40 G SEL 42B, and a 100 G SEL 42C. Based on the MSI value from the controller 6, the output SEL 42 selects data corresponding to TS to be used for multiplexing. The 10 G SEL 42A is a switch for connecting to the 10 G multiplexer 32A to select the 10 G frame in a unit of TS. The 40 G SEL 42B is a switch for connecting to the 40 G restore PSW 43 to select the 40 G frame in a unit of TS. The 100 G SEL 42C is a switch for connecting to the 100 G restore PSW 44 to select the 100 G frame in a unit of TS.

Each of 40 G restore PSWs 43 is a switch for restoring TS numbers sorted by the 10 G TSPSW 45A in the 40 G transmission-side PSW 45 to TS numbers prior to sorting. The 40 G restore PSW 43 includes four (#1 to #4) 10 G restore TSPSW 43A, and a SEL 43B. Each of 10 G restore TSPSWs 43A is a switch for restoring TS numbers sorted in the 10 G frame by the 10 G TSPSW 45A to TS numbers prior to sorting for each of 10 G frames stored in the 40 G frame, and outputting data to the SEL 43B. The SEL 43B outputs output of each of 10 G restore TSPSWs 43A or 1 G data to the 40 G multiplexer 33A in the 40 G processor 33. Based on the MSI value of the 40 G frame, the controller 6 controls the SEL 43B to input the 10 G frame from each of 10 G restore TSPSWs 43A to the 40 G multiplexer 33A.

The 100 G restore PSW 44 is a switch for restoring TS numbers sorted in the 100 G transmission-side PSW 46 to TS numbers prior to sorting to connect a path between the output SEL 42 and the 100 G processor 34. The 100 G restore PSW 44 includes two (#1 and #2) 40 G restore TSPSWs 44A, ten (#1 to #10) 10 G restore TSPSWs 44B, and a SEL 44C. Each of 40 G restore TSPSWs 44A restores TS numbers sorted in the 40 G frame by the 40 G TSPSW 46B to TS numbers prior to sorting for each of 40 G frames stored in the 100 G frame, and outputs data to the SEL 44C. Each of 10 G restore TSPSWs 44B is a switch for restoring TS numbers sorted in the 10 G frame by the 10 G TSPSW 46A to TS numbers prior to sorting for each of 10 G frames stored in the 100 G frame, and outputting to the SEL 44C. The SEL 44C outputs output of each of 40 G restore TSPSWs 44A, output of each of 10 G restore TSPSWs 44B, or 1 G data to the 100 G multiplexer 34A in the 100 G processor 34. Based on the MSI value in the 100 G frame, the controller 6 controls the SEL 44C to input a frame from each of 40 G restore TSPSWs 44A or each of 10 G restore TSPSWs 44B to the 100 G multiplexer 34A.

Each of 10 G processors 32 includes a 10 G distributor 32C. The 10 G distributor 32C distributes the 10 G frame generated by the 10 G frame processor 32B to the 10 G output interface 3C and the output SEL 42.

Each of 40 G processors 33 includes a 40 G distributor 33C. The 40 G distributor 33C distributes the 40 G frame generated by the 40 G frame processor 33B to the 40 G output interface 3B and the output SEL 42. The 100 G frame processor 34B outputs 100 G frames multiplexed by the 100 G multiplexer 34A from the 100 G output interface 3A.

Based on the MSI value, the controller 6 controls switching of the output SEL 42, the SEL 43B in the 40 G restore PSW 43, and the SEL 44C in the 100 G restore PSW 44.

In response to a switching operation of the transmission-side SW 35, the multiplexing device 5 enables connection among processors by switching over, in a predetermined unit, signals from one 100 G processor 34, two 40 G processors 33, ten 10 G processors 32, and eighty 1 G processors 31, and thereby reduces the number of nG processors involved in the multiplexing to a minimum.

Next, operation of the transmission apparatus 1 according to the embodiment is described. First, operation of the demultiplexing device 4 when demultiplexing 100 G frames inputted in the 100 G input interface 2A is described.

When a 100 G frame is inputted from the 100 G input interface 2A, the 100 G processor 11 in the demultiplexing device 4 illustrated in FIG. 3 extracts the MSI value from the OH of the 100 G frame, and notifies the extracted MSI value to the 100 G demultiplexer 11B, and the controller 6.

The 100 G demultiplexer 11B demultiplexes a payload in the 100 G frame to low speed frames such as the 10 G frame and the 40 G frame based on the extracted MSI value for each of TS numbers of the 100 G frame. Based on the MSI value for each of TS numbers, the controller 6 identifies the number of low speed frames for each type of low speed frames to be stored in the 100 G frame.

Assume that the controller 6 has identified, for example, six 10 G frames (8 TS), and one 40 G frame (32 TS). The controller 6 registers, in the management table 7, sorting information of TS numbers of each of 10 G frames in the 100 G frame sorted in the ascending order. Based on the sorting information in the management table 7, the controller 6 allocates 10 G frames from the 100 G demultiplexer 11B to six 10 G TSPSWs 21B in the 100 G reception-side PSW 21.

Further, the controller 6 registers, in the management table 7, sorting information of the TS numbers sorted in one 40 G frame in the 100 G frame. Based on the sorting information in the management table 7, the controller 6 allocates 40 G frames from the 100 G demultiplexer 11B to the 40 G TSPSW 21A.

Each of 10 G TSPSWs 21B outputs a 10 G frame with a sorted TS number to each of 10 G processors 13. The 40 G TSPSW 21A outputs a 40 G frame with a sorted TS number to the 40 G processor 12.

The 40 G SEL 12C in the 40 G processor 12 outputs a 40 G frame with a sorted TS number from the 40 G TSPSW 21A to the 40 G frame processor 12A. The 40 G frame processor 12A extracts the MSI value from the OH of the 40 G frame, and notifies the extracted MSI value to the 40 G demultiplexer 12B, and the controller 6.

The 40 G demultiplexer 12B demultiplexes a payload in the 40 G frame to low speed frames such as the 10 G frame based on the MSI value. Based on the MSI value, the controller 6 identifies the number of low speed frames for each type of low speed frames stored in the 40 G frame.

Assume that the controller 6 identifies, for example, four 10 G frames (8 TS). The controller 6 registers, in the management table 7, sorting information of TS numbers of each of 10 G frames in the 40 G frame sorted in the ascending order. Based on the sorting information in the management table 7, the controller 6 performs switch setting of the 10 G TSPSW 22A such that 10 G frames from the 40 G demultiplexer 12B are arranged with maximum four MSI values in ascending order. Each of 10 G TSPSWs 22A outputs a 10 G frame with a sorted TS number to each of 10 G processors 13. The 40 G demultiplexer 12B outputs a 40 G frame with an unsorted TS number to the 40 G SEL 23B in the input SEL 23.

The 10 G SEL 13C in the 10 G processor 13 outputs a 10 G frame with a sorted TS number from the 10 G TSPSW 22A in the 40 G reception-side PSW 22 to the 10 G frame processor 13A. The 10 G frame processor 13A outputs a frame demultiplexed by the 10 G demultiplexer 13B to the 10 G SEL 23C in the input SEL 23.

The 10 G SEL 13C outputs a 10 G frame with a sorted TS number from each of 10 G TSPSWs 21B in the 100 G reception-side PSW 21 to the 10 G frame processor 13A. The 10 G frame processor 13A outputs a 10 G frame from the 10 G demultiplexer 13B to the 10 G SEL 23C in the input SEL 23.

Further, the reception-side PSW 24 restores a TS number of 80 TS to a TS number prior to sorting from the input SEL 23, and outputs desired data of 80 TS from the SEL 27. Thus, the demultiplexing device 4 may demultiplex the 100 G frame to data of 80 TS.

Next, operation of the demultiplexing device 4 when demultiplexing the 40 G frame inputted into the 40 G input interface 2B is described. When a 40 G frame is inputted from the 40 G input interface 2B, the demultiplexing device 4 illustrated in FIG. 3 extracts the MSI value from the OH of the 40 G frame, and notifies the extracted MSI value to the 40 G demultiplexer 12B, and the controller 6.

The 40 G demultiplexer 12B demultiplexes a payload in the 40 G frame to a low speed frame such as the 10 G frame based on the MSI value for each of TS numbers of the 40 G frame. Based on the MSI value for each of TS numbers, the controller 6 identifies the number of low speed frames for each type of low speed frames stored in the 40 G frame.

Assume that the controller 6 identifies, for example, four 10 G frames (8 TS). The controller 6 registers, in the management table 7, sorting information of TS numbers of four 10 G frames in the 40 G frame sorted in ascending order. Based on the sorting information in the management table 7, the controller 6 performs switch setting of the 10 G TSPSW 22A such that 10 G frames from the 40 G demultiplexer 12B are arranged with maximum four MSI values in ascending order Each of 10 G TSPSWs 22A outputs a 10 G frame with a sorted TS number to the 10 G processor 13. The 10 G SEL 13C in the 10 G processor 13 outputs a 10 G frame with a sorted TS number from the 10 G TSPSW 22A to the 10 G frame processor 13A. The 10 G frame processor 13A extracts the MSI value from the OH of the 10 G frame, and notifies the extracted MSI value to the 10 G demultiplexer 13B, and the controller 6. Each of 10 G demultiplexers 13B outputs a 10 G frame to the 10 G SEL 23C in the input SEL 23.

Further, the reception-side PSW 24 restores a TS number of 80 TS to a TS number prior to sorting from the input SEL 23, and outputs desired data of 80 TS from the SEL 27. Thus, the demultiplexing device 4 may demultiplex the 40 G frame to data of 32 TS.

Next, operation of the demultiplexing device 4 when demultiplexing the 10 G frame inputted in the 10 G input interface 2C is described. When a 10 G frame is inputted from the 10 G input interface 2C, each of 10 G processors 13 in the demultiplexing device 4 extracts the MSI value from the OH of the 10 G frame, and notifies the extracted MSI value to the 10 G demultiplexer 13B, and the controller 6.

The 10 G demultiplexer 13B outputs the 10 G frame from a payload in the 10 G frame to the input SEL 23 based on the MSI value. Further, the reception-side PSW 24 outputs desired data of 80 TS from the input SEL 23. Thus, the demultiplexing device 4 may demultiplex the 10 G frame to data of 8 TS.

Next, operation of the multiplexing device 5 is described. First, operation of the multiplexing device 5 generating a 100 G frame by multiplexing a 40 G frame and a 10 G frame is described.

The controller 6 illustrated in FIG. 5 registers, in the management table 7, sorting information of TS numbers sorted in ascending order based on the MSI value of the 100 G frame for each of groups. The controller 6 allocates input data to each of 10 G TSPSWs 46A and each of 40 G TSPSWs 46B based on the sorting information in the management table 7. Each of 10 G TSPSWs 46A outputs a 10 G frame corresponding to 8 TS to the 100 G SEL 42C in the output SEL 42 via the 10 G processor 32. Each of 40 G TSPSWs 46B outputs a 40 G frame corresponding to 32 TS to the 100 G SEL 42C in the output SEL 42 via the 40 G restore PSW 43 and the 40 G processor 33.

Based on the MSI value of the 100 G frame, the output SEL 42 outputs a 10 G frame and a 40 G frame forming the 100 G frame into the 100 G restore PSW 44. Each of 10 G restore TSPSWs 44B in the 100 G restore PSW 44 allocates a 10 G frame from the 100 G SEL 42C in the output SEL 42 so as to restore TS numbers sorted by the 10 G TSPSW 46A to TS numbers prior to sorting. Further, each of 40 G restore TSPSWs 44A in the 100 G restore PSW 44 allocates a 40 G frame from the 100 G SEL 42C in the output SEL 42 so as to restore TS numbers sorted by the 40 G TSPSW 46B to TS numbers prior to sorting. The SEL 44C selects an output frame of each of 10 G restore TSPSWs 44B and each of 40 G restore TSPSWs 44A, and 1 G data based on the MSI value of the 100 G frame, and outputs to the 100 G multiplexer 34A.

The 100 G multiplexer 34A multiplexes a 10 G frame of each of 10 G restore TSPSWs 44B, a 40 G frame of the 40 G restore TSPSW 44A, and 1 G data. The 100 G frame processor 34B generates a 100 G frame with multiplexed frames, and outputs the 100 G frame to the 100 G output interface 3A. Thus, the multiplexing device 5 can output the 100 G frame by multiplexing data of a 40 G frame and a 10 G frame.

Next, operation of the multiplexing device 5 generating a 100 G frame by multiplexing 1 G frames is described. The controller 6 illustrated in FIG. 5 generates a 10 G frame with 1 G frames based on the MSI value of the 100 G frame, and forms a 100 G frame with two 40 G frames including eight 10 G frames, and two 10 G frames.

Based on the MSI value of the 100 G frame, the 10 G SEL 42A sequentially outputs 1 G frames forming the 100 G frame to the 10 G multiplexer 32A in each of 10 G processors 32 in a unit of the 10 G frame. The 10 G multiplexer 32A generates a 10 G frame corresponding to 8 TS with eight 1 G frames, and outputs the 10 G frame to the output SEL 42 via the 10 G distributor 32C. At that time, the 10 G multiplexer 32A outputs eight 10 G frames to the 40 G SEL 42B, and two 10 G frames to the 100 G SEL 42C.

The 40 G SEL 42B in the output SEL 42 outputs 10 G frames corresponding to 64 TS to each of 40 G multiplexers 33A via the SEL 43B in the 40 G restore PSW 43. Each of 40 G multiplexers 33A multiplexes 10 G frames corresponding to 32 TS. The 40 G frame processor 33B generates a 40 G frame with multiplexed frames, and outputs the 40 G frame to the 100 G SEL 42C in the output SEL 42 via the 40 G distributor 33C.

The 100 G SEL 42C in the output SEL 42 outputs 40 G frames corresponding to 64 TS, and 10 G frames corresponding to 16 TS to the 100 G multiplexer 34A via the SEL 44C in the 100 G restore PSW 44. The 100 G multiplexer 34A multiplexes a 40 G frame or a 10 G frame. The 100 G frame processor 34B generates a 100 G frame with multiplexed frames, and outputs the 100 G frame to the 100 G output interface 3A. Thus, the multiplexing device 5 can output the 100 G frame by multiplexing a 10 G frame and a 40 G frame.

Next, operation of the multiplexing device 5 generating a 40 G frame by multiplexing 10 G frames is described. The controller 6 registers, in the management table 7, sorting information of TS numbers sorted in ascending order based on the MSI value of the 40 G frame on the group basis. The controller 6 allocates input data to each of 10 G TSPSWs 45A in the 40 G transmission-side PSW 45 based on the sorting information in the management table 7. Each of 10 G TSPSW 45A outputs a 10 G frame corresponding to 8 TS to the 40 G SEL 42B in the output SEL 42 via the 10 G processor 32.

Based on the MSI value of the 40 G frame, the output SEL 42 outputs 10 G frames forming a 40 G frame into the 40 G restore PSW 43. Each of 10 G restore TSPSWs 43A in the 40 G restore PSW 43 allocates a 10 G frame from the 40 G SEL 42B in the output SEL 42 so as to restore TS numbers sorted by the 10 G TSPSW 45A to TS numbers prior to sorting. The SEL 43B outputs output of each of 10 G restore TSPSWs 44B to the 40 G multiplexer 33A based on the MSI value of the 40 G frame.

The 40 G multiplexer 33A multiplexes 10 G frames of each of 10 G restore TSPSWs 43A. The 40 G frame processor 33B generates a 40 G frame with multiplexed frames, and outputs the 40 G frame to the 40 G output interface 3B. Thus, the multiplexing device 5 can output the 40 G frame by multiplexing, for example, 10 G frames.

Next, operation of the multiplexing device 5 generating a 10 G frame by multiplexing 1 G frames is described. Based on the MSI value of the 10 G frame, the 10 G SEL 42A of the output SEL 42 inputs TS number data of the 1 G frame, and outputs 1 G frames corresponding to 8 TS to the 10 G multiplexer 32A in the 10 G processor 32. The 10 G multiplexer 32A multiplexes 1 G frames corresponding to 8 TS. The 10 G frame processor 32B generates a 10 G frame with multiplexed frames, and outputs the 10 G frame to the 10 G output interface 3C. Thus, the multiplexing device 5 can output the 10 G frame by multiplexing, for example, 1 G frames.

FIGS. 6A, 6B, and 6C are illustrative diagrams illustrating examples of TS number sorting operation of the 100 G reception-side PSW 21. The controller 6 extracts TS numbers of the same MSI value out of 80 TS corresponding to the 100 G frame. As illustrated in FIG. 6A, the controller 6 extracts 8 TS of "1", "3", "5", "7", "9", "11", "13", and "15" as TS numbers of the MSI value "1". The controller 6 extracts 8 TS of "2", "4", "6", "8", "10", "12", "14", and "16" as TS numbers of the MSI value "2".

Further, as illustrated in FIG. 6B, the controller 6 sorts TS numbers "1", "3", "5", "7", "9", "11", "13", and "15" as a group of the MSI value "1". Further, the controller 6 sorts TS numbers "2", "4", "6", "8", "10", "12", "14", and "16" as a group of the MSI value "2".

As illustrated in FIG. 6C, the controller 6 sorts TS numbers to "1" to "8" such that TS numbers are arranged in the ascending order in a group of the MSI value "1". That is, the controller 6 registers, in the management table 7, sorting information indicating sorting of TS numbers corresponding to the MSI value "1", "1", "3", "5", "7", "9", "11", "13", and "15" to TS numbers of the #1 10 G TSPSW 21B, "1" to "8". Thus, the #1 10 G TSPSW 21B can output 10 G frames corresponding to the MSI value "1" to the #1 10 G processor 13 in a unit of TS.

The controller 6 sorts TS numbers to "9" to "16" such that TS numbers are arranged in the ascending order in the group of the MSI value "2". That is, the controller 6 registers, in the management table 7, sorting information indicating sorting of TS numbers corresponding to the MSI value "2", "2", "4", "6", "8", "10", "12", "14", and "16" to TS numbers of the #2 10 G TSPSW 21B, "9" to "16". Thus, the #2 10 G TSPSW 21B can output 10 G frames corresponding to the MSI value "2" to the #2 10 G processor 13 in a unit of TS.

Figure 7C:
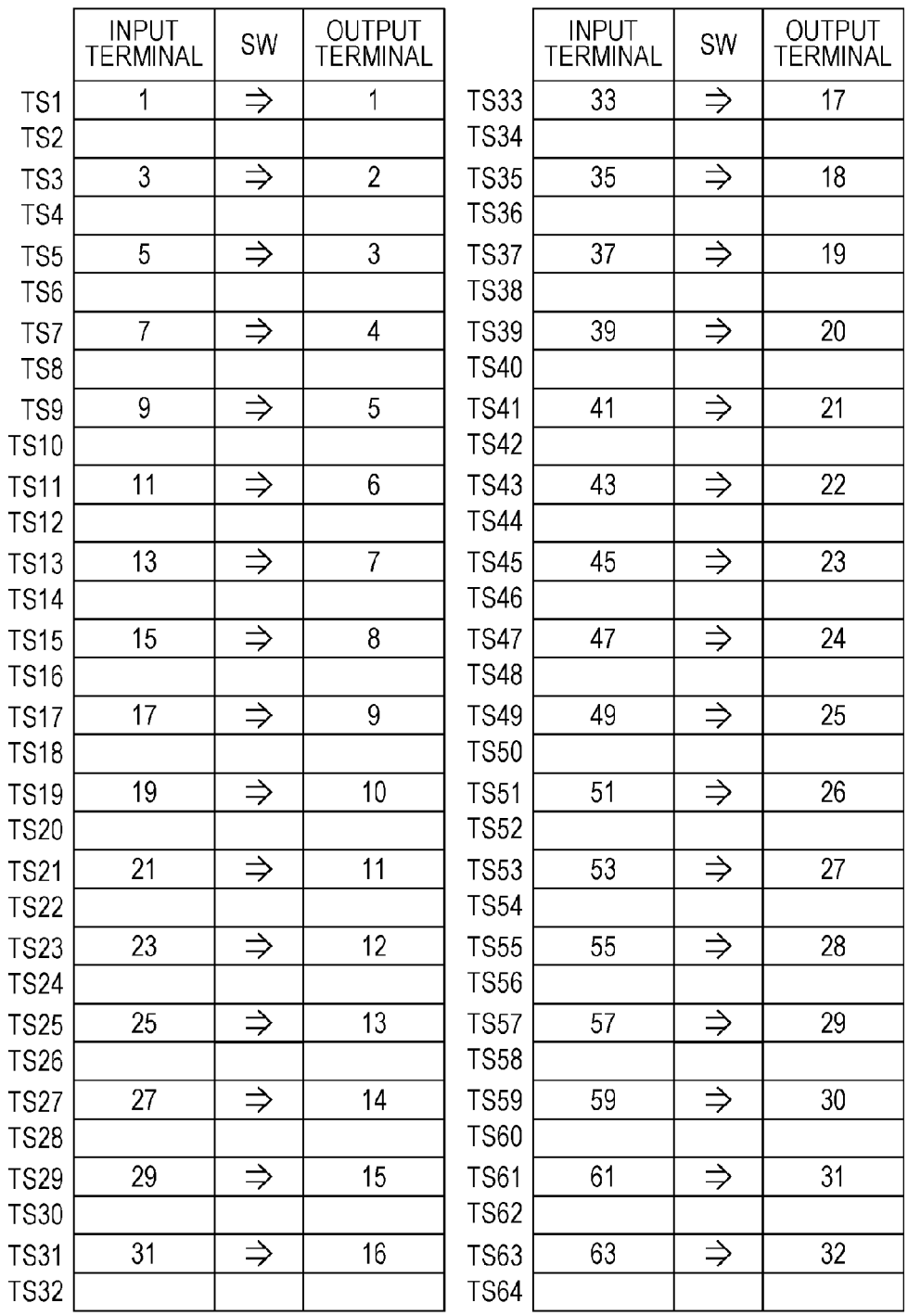
FIG. 7C is an illustrative diagram illustrating an example of a TS number sorting operation of a 100 G reception-side PSW.

FIGS. 7A, 7B, and 7C are illustrative diagrams illustrating examples of TS number sorting operation of the 100 G reception-side PSW 21. The controller 6 extracts TS numbers of the same MSI value out of 80 TS corresponding to the 100 G frame. As illustrated in FIG. 7A, the controller 6 extracts 32 TS of "1", "3", "5", "7", "9", "11", "13", "15", "17", . . . "59", "61", and "63" as TS numbers of the MSI value "1".

Further, as illustrated in FIG. 7B, the controller 6 sorts TS numbers "1", "3", "5", . . . "59", "61", and "63" as the group of the MSI value "1". As illustrated in FIG. 7C, the controller 6 sorts TS numbers to "1" to "32" such that TS numbers are arranged in the ascending order in the group of the MSI value "1". That is, the controller 6 registers, in the management table 7, sorting information indicating sorting of TS numbers corresponding to the MSI value "1", "1", "3", "5", . . . "59", "61", and "63" to TS numbers of the #1 40 G TSPSW 21A, "1" to "32". Thus, the #1 40 G TSPSW 21A can output 40 G frames corresponding to the MSI value "1" to the #1 40 G processor 12 in a unit of TS.

Figure 8A:
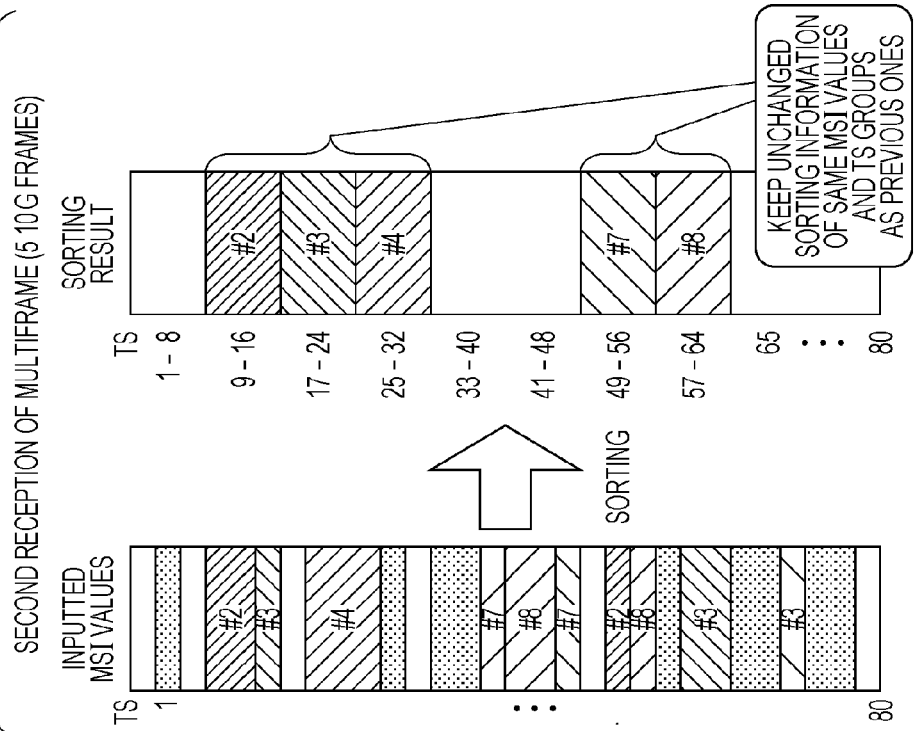
FIGS. 8A and 8B are illustrative diagrams illustrating an example of a management table related to a hitless processing.

FIG. 8A to FIG. 9B are illustrative diagrams illustrating an example of the management table 7 related to the hitless processing. Assume that on first reception of the multiframe, for example, TS of 8 MSI values #1 to #8 co-exist in 80 TS. One multiframe, for example, corresponds to 256 frames, and when a multiframe corresponding to 256 frames is received, a MSI value corresponding to 80 TS is fixed. As illustrated in FIG. 8A, the controller 6 extracts the TS number of the 10 G frame for each group of MSI values.

The controller 6 sorts TS numbers of the 10 G frame for each of groups of MSI values in the ascending order, and registers the sorting information in the management table 7. The controller 6 sorts TS numbers of the 10 G frame for each of groups in the ascending order from the TS number 1 in a row order of inputted MSI values. That is, the controller 6 registers, in the management table 7, the sorting information including TS numbers of the 10 G frame #1 sorted to TS numbers 1 to 8, TS numbers of the 10 G frame #2 sorted to TS numbers 9 to 16, and TS numbers of the 10 G frame #3 sorted to TS numbers 17 to 24. Further, the controller 6 registers, in the management table 7, the sorting information including TS numbers of the 10 G frame #4 sorted to TS numbers 25 to 32, TS numbers of the 10 G frame #5 sorted to TS numbers 33 to 40, and TS numbers of the 10 G frame #6 sorted to TS numbers 41 to 48. The controller 6 registers, in the management table 7, sorting information including TS numbers of the 10 G frame #7 sorted to TS numbers 49 to 56, and TS numbers of the 10 G frame #8 sorted to TS numbers 57 to 64. The controller 6 can identify the idle state or unused state of TS numbers 65 to 80 by referring to the management table 7.

Figure 10:
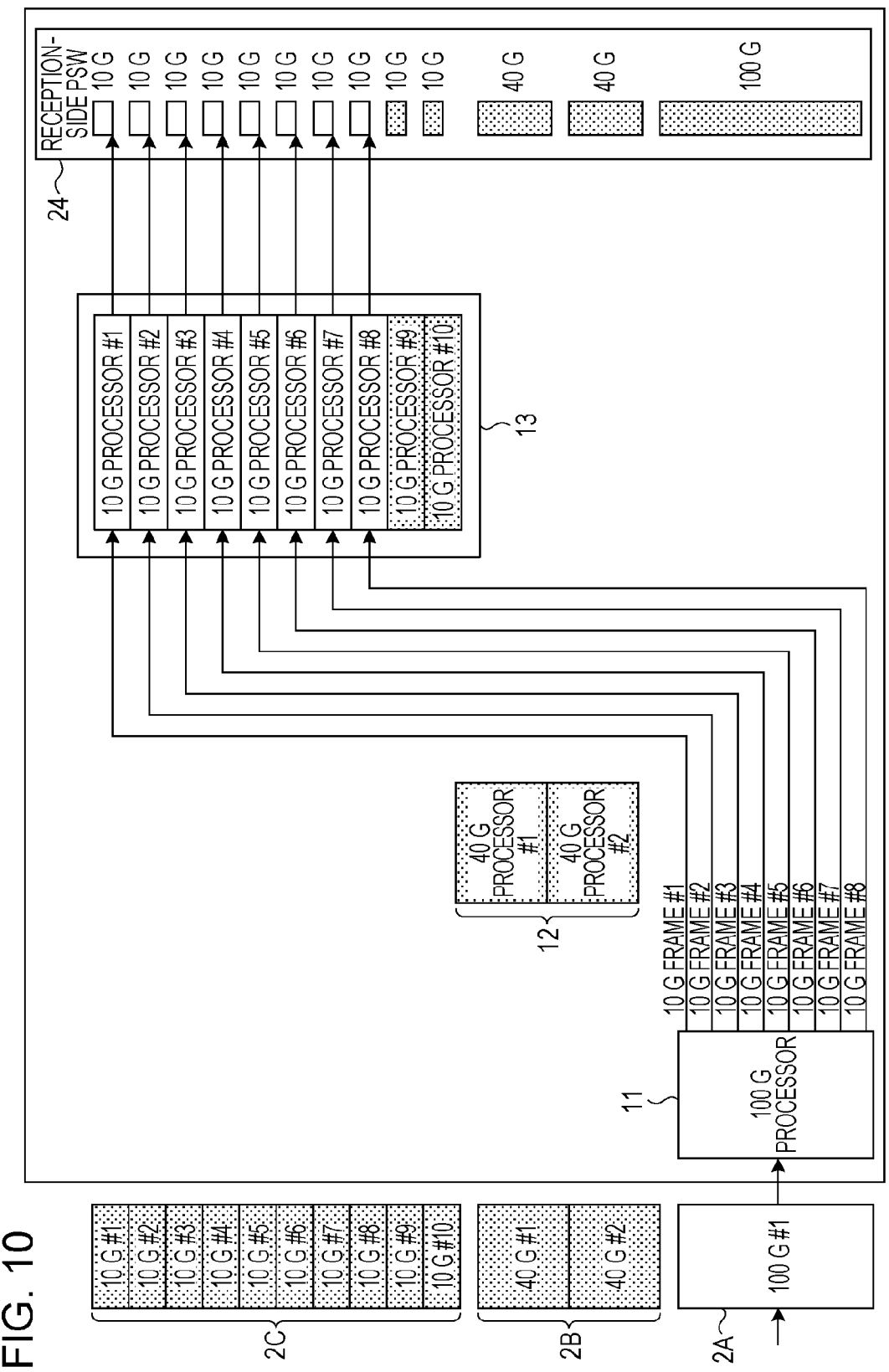
FIG. 10 is an illustrative diagram illustrating an example of a switching selection operation of a 10 G processor according to the hitless processing.

As illustrated in FIG. 10, the controller 6 allocates, by referring to the management table 7, the 10 G frame #1 from the 100 G processor 11 to the #1 10 G processor 13 corresponding to TS numbers 1 to 8, and the 10 G frame #2 to the #2 10 G processor 13 corresponding to TS numbers 9 to 16. The controller 6 allocates the 10 G frame #3 to the #3 10 G processor 13 corresponding to TS numbers 17 to 24, the 10 G frame #4 to the #4 10 G processor 13 corresponding to TS numbers 25 to 32, and the 10 G frame #5 to the #5 10 G processor 13 corresponding to TS numbers 33 to 40. The controller 6 allocates the 10 G frame #6 to the #6 10 G processor 13 corresponding to TS numbers 41 to 48, the 10 G frame #7 to the #7 10 G processor 13 corresponding to TS numbers 49 to 56, and the 10 G frame #8 to the #8 10 G processor 13 corresponding to TS numbers 57 to 64. Based on the sorting information within the management table 7, the controller 6 identifies the used state of #1 to #8 10 G processors 13, and the unused state of #9 to #10 10 G processors 13.

Figure 8B:
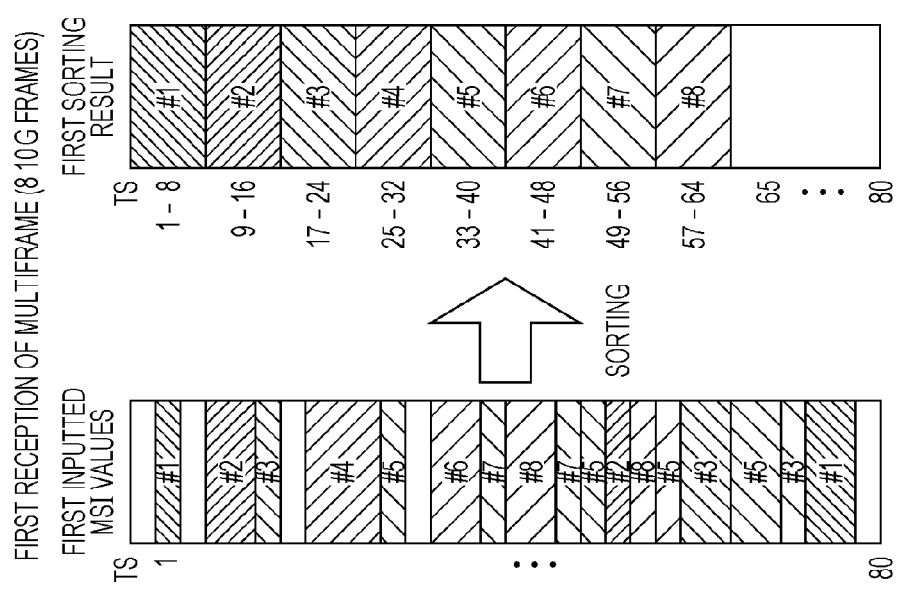

Next, assume that on second reception of the multiframe, for example, 10 G frames #1, #5, and #6 are deleted from the previous state (first reception of the multiframe). As illustrated in FIG. 8B, the controller 6 deletes the sorting information of 10 G frames #1, #5, and #6 from the management table 7 while maintaining the previous sorting information of 10 G frames #2 to #4, #7, and #8.

Figure 11:
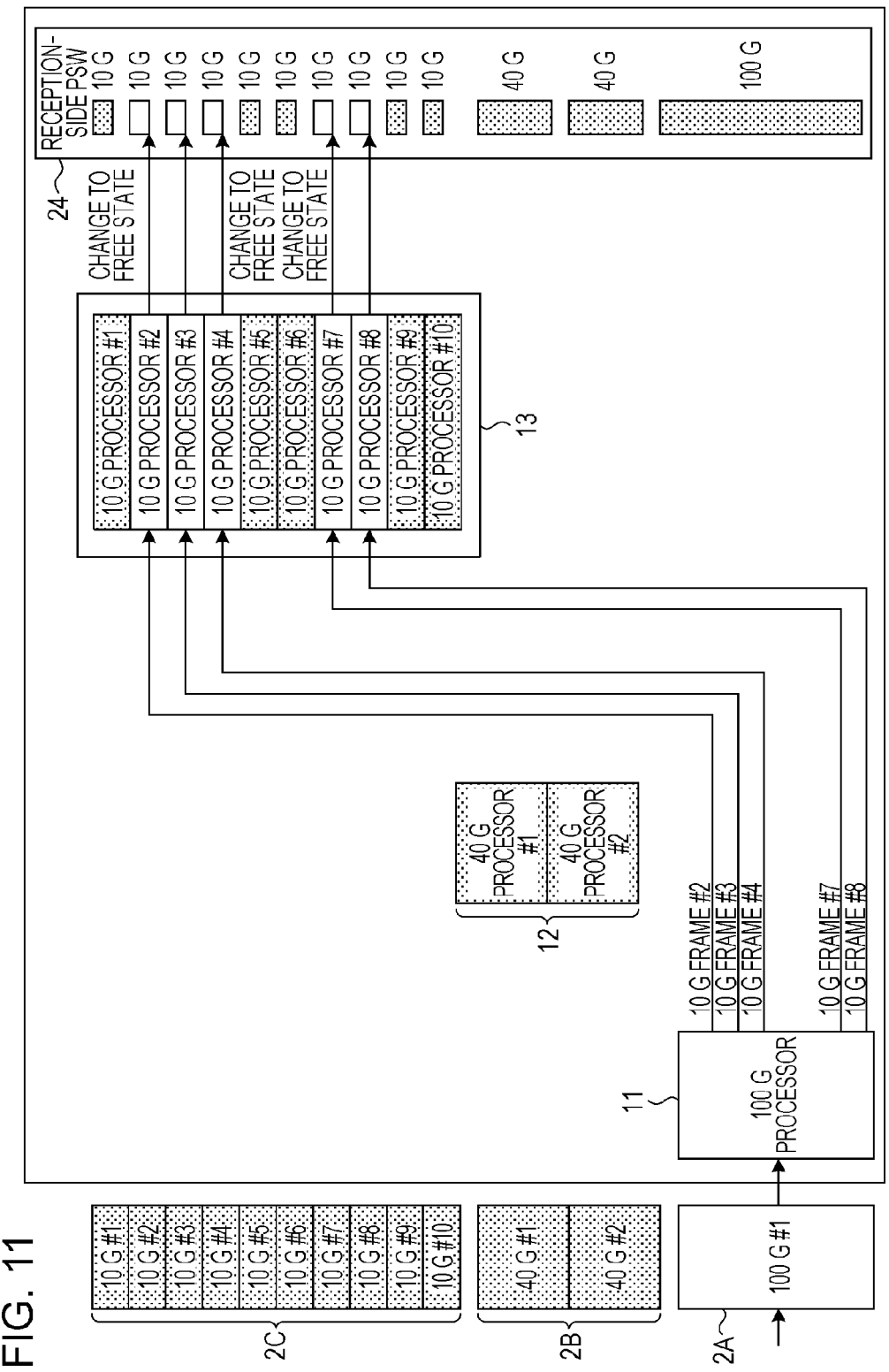
FIG. 11 is an illustrative diagram illustrating an example of a switching selection operation of a 10 G processor according to the hitless processing (when MSI is deleted)

In response to the deletion of 10 G frames #1, #5, and #6, the controller 6 cancels allocation to the #1 10 G processor 13, the #5 10 G processor 13, and #6 10 G processor 13 based on the sorting information within the management table 7 as illustrated in FIG. 11. Further, the controller 6 keeps allocation of the 10 G frame #2 from the 10 G processor 11 to the #2 10 G processor 13, the 10 G frame #3 to the #3 10 G processor 13, and the 10 G frame #4 to the #4 10 G processor 13. Further, the controller 6 holds allocation of the 10 G frame #7 to the #7 10 G processor 13, and the 10 G frame #8 to the #8 10 G processor 13. That is, since the demultiplexing device 4 holds the connecting state related to the previous sorting information between the 100 G processor 11, and the 10 G processor 13, there is no switching operation between 10 G processors 13, and thereby hitless data communication without data omission is ensured. Based on the sorting information within the management table 7, the controller 6 identifies the used state of #2 to #4, #7, and #8 10 G processors 13, and the unused state of #1, #5, #6, #9, and #10 10 G processors 13.

Figure 9A:
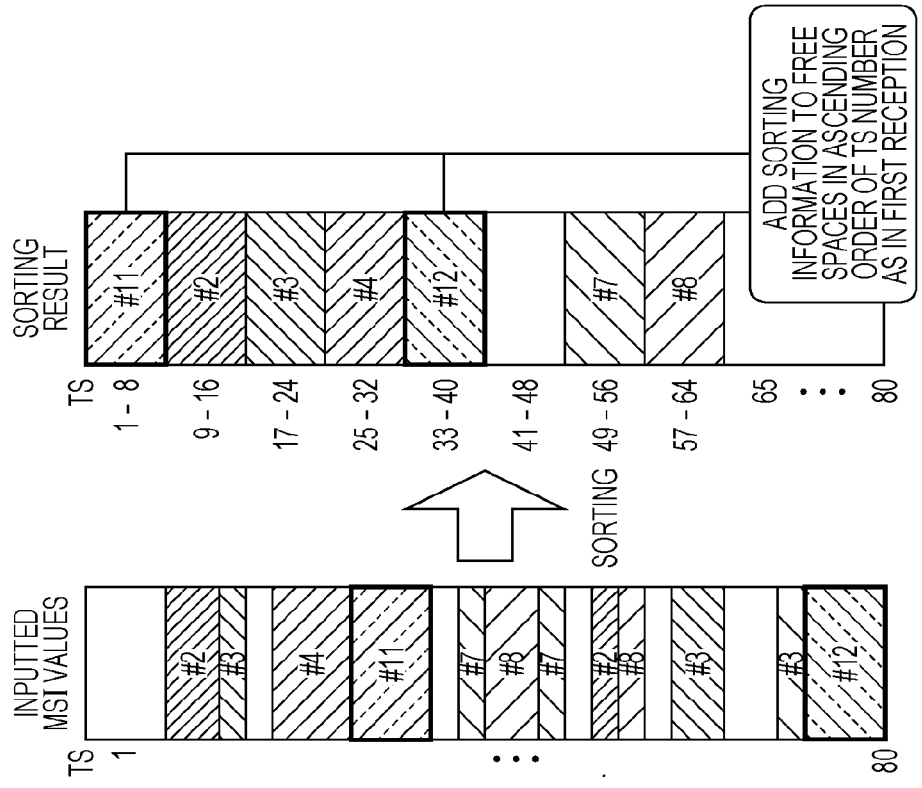
FIGS. 9A and 9B are illustrative diagrams illustrating an example of a management table related to the hitless processing.

Further, on third reception of the multiframe, the state of the multiframe is kept unchanged from that at the previous time (second reception of the multiframe) as illustrated in FIG. 9A. As illustrated in FIG. 9A, the controller 6 keeps the sorting information of 10 G frames #2 to #4, #7, and #8 unchanged. That is, since the demultiplexing device 4 holds the connecting state related to the previous sorting information between the 100 G processor 11, and the 10 G processor 13, there is no switching operation between 10 G processors 13, and thereby hitless data communication is ensured.

Figure 9B:
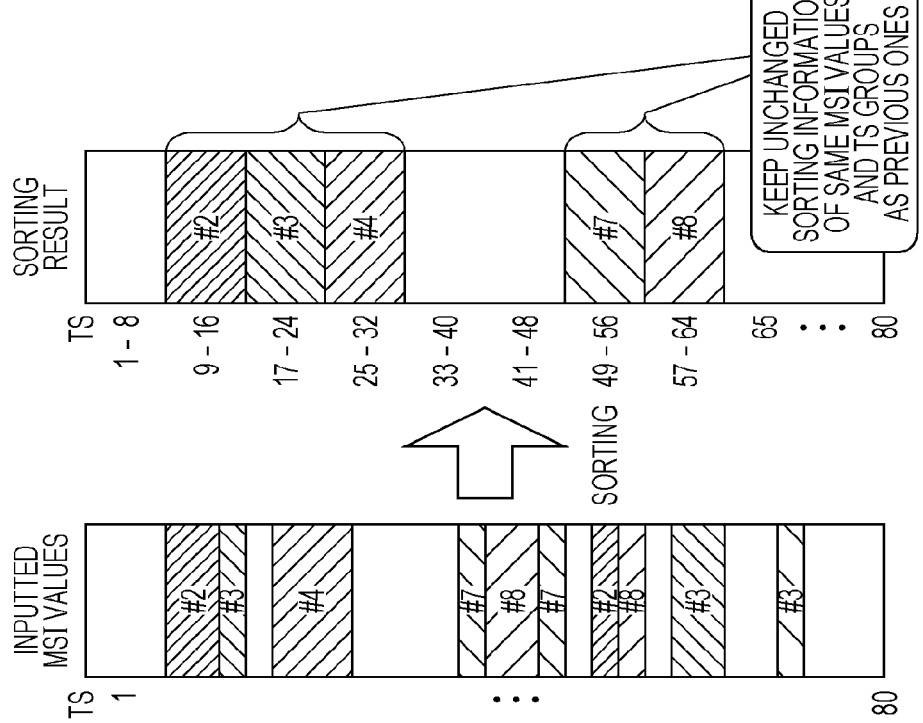

Further, assume that on fourth reception of the multiframe, for example, frames #11, and #12 are newly added from the previous state (when the third multiframe is received) as illustrated in FIG. 9B. The controller 6 adds the sorting information of 10 G frames #11 and #12 to free spaces in the ascending order from the TS number "1" without changing the sorting information of 10 G frames #2 to #4, #7, and #8. Thus, the controller 6 additionally registers, in the management table 7, the sorting information including TS numbers of the 10 G frame #11 sorted to TS numbers 1 to 8, and TS numbers of the 10 G frame #12 sorted to TS numbers 33 to 40, while maintaining the previous sorting information of 10 G frames #2 to #4, #7 and #8.

Figure 12:
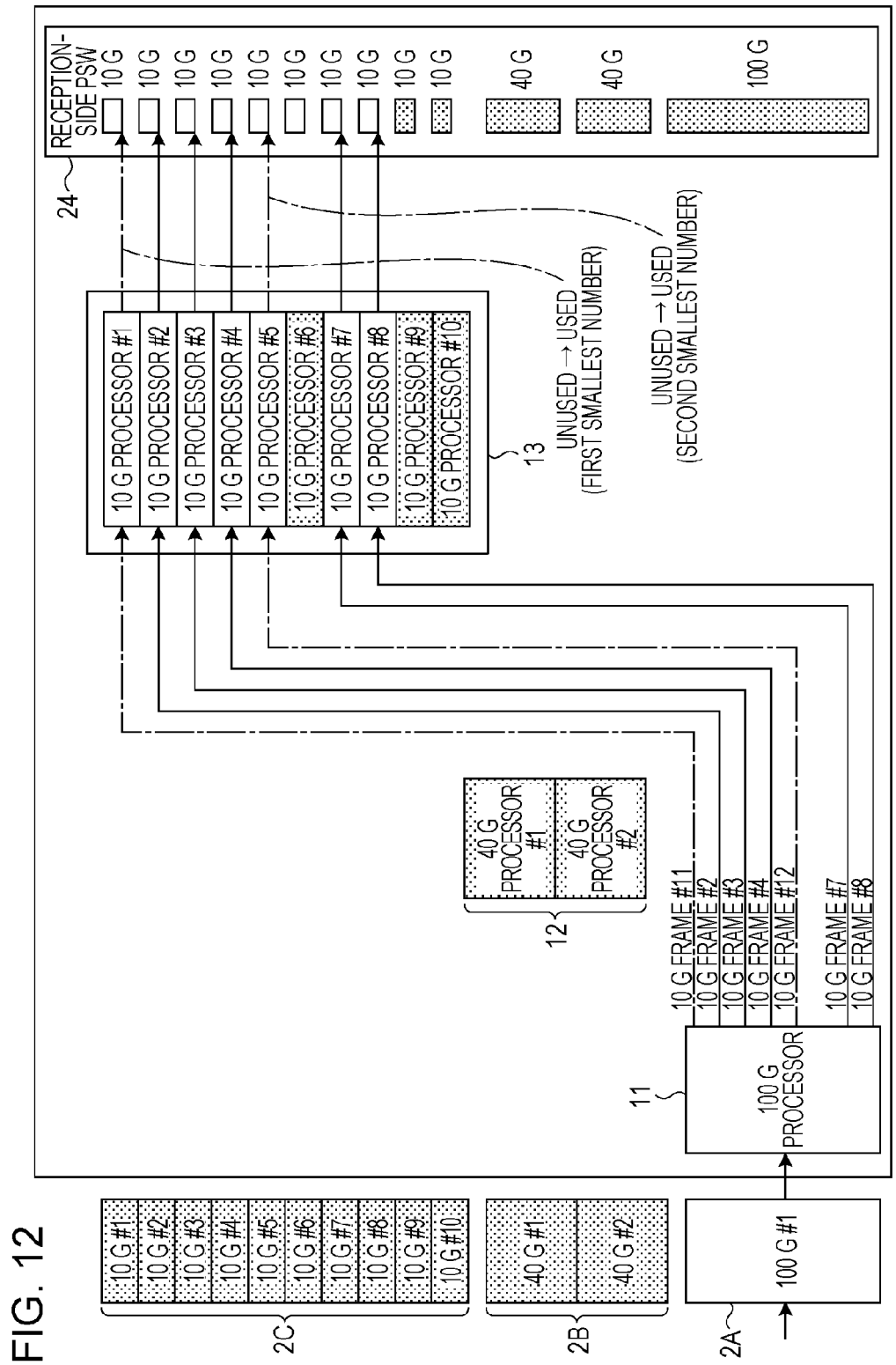
FIG. 12 is an illustrative diagram illustrating an example of a switching selection operation of the 10 G processor according to the hitless processing (when MSI is added)

Based on the sorting information within the management table 7, the controller 6 allocates the 10 G frame #11 to the unused #1 10 G processor 13, and the 10 G frame #12 to the unused #5 10 G processor 13 while maintaining a previous allocation of the 10 G frames #2 to #4, #7, and #8, as illustrated in FIG. 12. That is, since the demultiplexing device 4 holds the connecting state related to the previous sorting information between the 100 G processor 11, and the 10 G processor 13, there is no switching operation between 10 G processors 13, and thereby hitless data communication is ensured. Based on the sorting information within the management table 7, the controller 6 identifies the used state of #1 to #5, #7, and #8 10 G processors 13, and the unused state of #6, #9, and #10 10 G processors 13.

Figure 13:
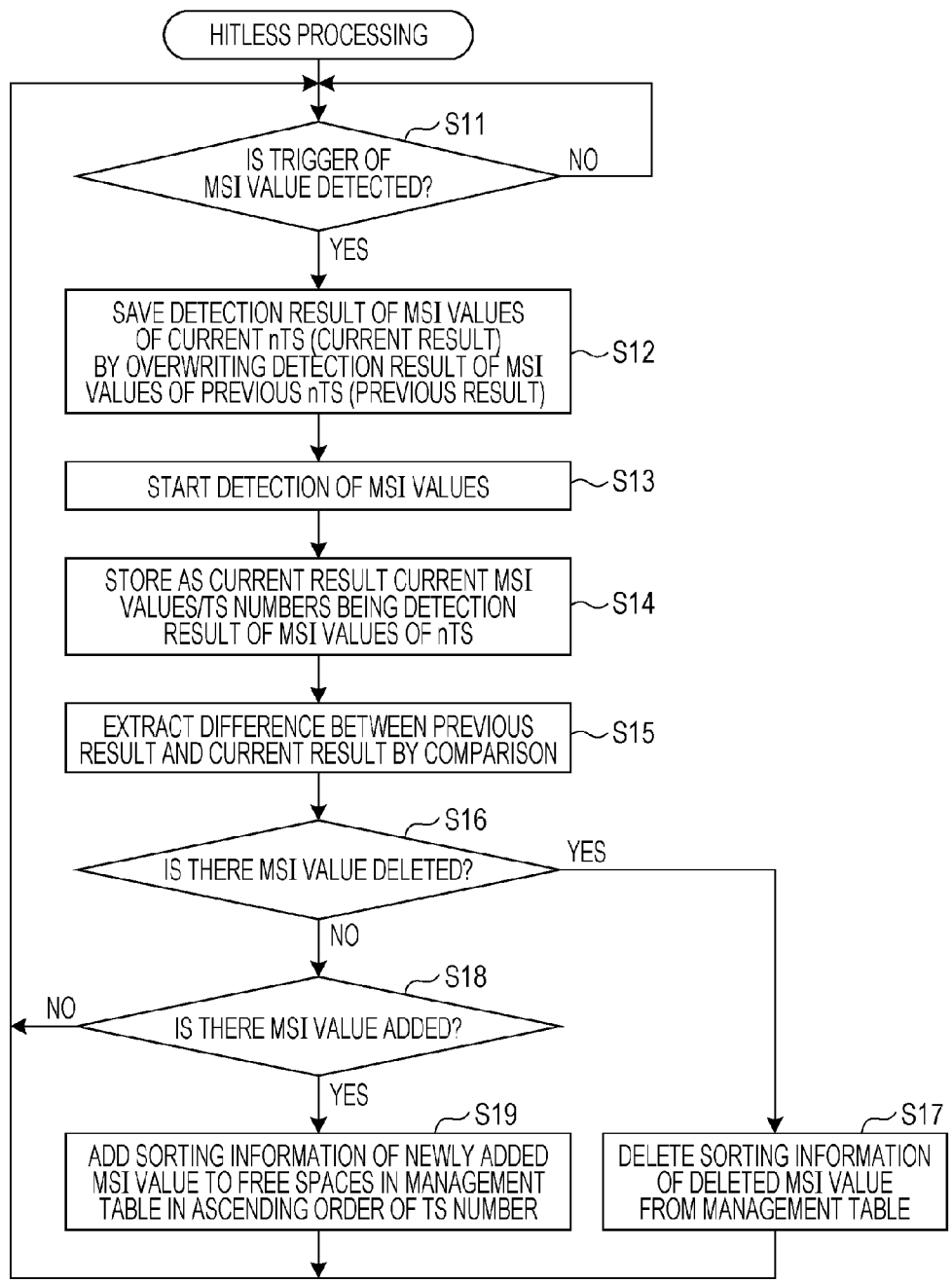
FIG. 13 is a flowchart illustrating an example of a processing operation of a controller involved in the hitless processing.

FIG. 13 is a flowchart illustrating an example of a processing operation of a controller 6 involved in the hitless processing of the transmission apparatus 1. The hitless processing illustrated in FIG. 13 is a processing for performing hitless data communication each time a multiframe is received, by maintaining the sorting information of same MSI values as a previous receipt of the multiframe, even when MSI values for each of TS numbers are partly different from current MSI values.

The controller 6 determines whether a detection trigger of the MSI value is detected (operation S11). The detection trigger of the MSI value is a start timing of the 80 TS cycle of 256 frames which is a unit of the multiframe. When detected the detection trigger of the MSI value (when operation S11 is affirmative), the controller 6 overwrites the sorting information of current MSI values of n TS (current result) described later as the sorting information of previous MSI values of the n TS (previous result) into the register (operation S12). "n" is, for example, a natural number of 1 to 80.

The controller 6 starts detection of current MSI values of n TS (operation S13), and when completed detection of the sorting information of all n TS corresponding to one multiframe, the controller 6 stores the sorting information as a current result (operation S14).

The controller 6 compares a previous result and a current result with each other, and extracts a difference therebetween (operation S15). Based on the extraction result, the controller 6 determines whether there is a MSI value deleted from the management table 7 (operation S16). If any MSI value is deleted (when operation S16 is affirmative), the controller 6 deletes the sorting information corresponding to the deleted MSI value from the management table 7 (operation S17). The controller 6 shifts to the operation S11 to determine whether a detection trigger of the MSI value is detected.

If there is no MSI deleted (when operation S16 is negative), the controller 6 determines based on the extraction result whether there is a MSI value added (operation S18). If there is a MSI value added (operation S18 is affirmative), the controller 6 adds the sorting information of the added MSI value into a free space in the ascending order in the management table 7 (operation S19). Then, the controller 6 shifts to the operation S11 to determine whether a detection trigger of the MSI value is detected. If there is no previous record due to a first reception of the multiframe, the controller 6 determines the sorting information of all of currently detected MSI values as additional MSI values.

If there is no MSI value added (operation S18 is negative), the controller 6 shifts to the operation S11 to determine whether a detection trigger of the MSI value is detected.

In response to the detection trigger of the MSI value, the controller 6 performing the hitless processing illustrated in FIG. 13 compares a previous MSI value and a current MSI value with each other for each of TS numbers. Further, when there is no previous MSI value deleted, or when there is no current MSI value added, the controller 6 determines that previous MSI values are same as current MSI values, and holds the sorting information corresponding to MSI values of the TS numbers in the management table 7 as is. Thus, the controller 6 holds the connecting state of a high order nG processor relative to a low order nG processor, and thereby suppresses switching operation of nG processors and ensures hitless data communication. For example, when the high order nG processor is a 100 G processor 11, the low order nG processor is a 40 G processor 12, or 10 G processor 13.

When there is a newly added MSI value, the controller 6 newly registers the sorting information related to the newly added MSI value into a smallest free TS number in the management table 7. The controller 6 performs switching operation of an nG processor related to the sorting information corresponding to the newly added MSI value while holding the connecting state of a high order nG processor relative to a low order nG processor related to the previous sorting information. Thus, hitless data communication is ensured while suppressing switching operation of the nG processor to a minimum.

When there is a MSI value deleted from previous sorting information, the controller 6 deletes the sorting information related to the deleted MSI value from the management table 7. The controller 6 deletes the sorting information corresponding to the deleted MSI value while holding the connecting state of a high order nG processor to a low order nG processor related to the previous sorting information. Thus, hitless data communication is ensured while suppressing switching operation of the nG processor.

The demultiplexing device 4 according to the embodiment includes a reception-side SW 15 configured to switch over signals from 100 G demultiplexer 11B, a 40 G demultiplexer 12B, and a 10 G demultiplexer 13B in a predetermined unit to connect processors with each other. The controller 6 detects a frame inputted into the 100 G demultiplexer 11B, the 40 G demultiplexer 12B, or the 10 G demultiplexer 13B. Upon detecting an input frame, the controller 6 controls the reception-side SW 15 based on the MSI value for each of TS numbers of the input frame so as to connect to the 40 G demultiplexer 12B or the 10 G demultiplexer 13B, whichever corresponds to the output frame output by demultiplexing the input frame. Unlike conventional techniques, the demultiplexing device 4 does not have to have one 100 G demultiplexer, two 40 G demultiplexers, eighteen 10 G demultiplexers, and two hundred and eighty-eight 1 G demultiplexers according to the combination pattern of ODU. That is, in response to a switching operation of the reception-side SW 15, the demultiplexing device 4 enables connection among processors by switching over, in a predetermined unit, signals from one 100 G demultiplexer 11B, two 40 G demultiplexers 12B, ten 10 G demultiplexers 13B, and eighty 1 G demultiplexers 14B, and thereby reduces the number of nG processors involved in the demultiplexing to a minimum. Thus, the circuit scale can be reduced by reducing the number of implemented circuits, and thereby power consumption can be reduced.

As extracting a MSI value for each of TS numbers of an input frame of each of demultiplexers, the demultiplexing device 4 can identify and select a demultiplexer corresponding to a frame output by demultiplexed the input frame.

The demultiplexing device 4 compares a previous MSI value and a current MSI value with each other for each of TS numbers, and if there is a previous MSI value deleted, deletes the sorting information related to the deleted MSI value from the management table 7 while holding the sorting information for MSI values same as previous MSI values. The demultiplexing device 4 deletes the sorting information corresponding to the deleted MSI value while holding the connecting state a nG processor related to the sorting information corresponding to MSI values same as previous MSI values. Thus, hitless data communication is ensured.

Further, when there is a MSI value newly added on this occasion, the demultiplexing device 4 newly registers the sorting information of the newly added MSI value by adding into a smallest free TS number in the management table 7 while holding the sorting information of MSI values same as previous MSI values. The controller 6 performs switching operation of an nG processor related to the sorting information corresponding to the newly added MSI value while holding the connecting state to an nG processor related to the sorting information corresponding to MSI values same as previous MSI values. Thus, hitless data communication is ensured while suppressing switching operation to a minimum.

The multiplexing device 5 includes a transmission-side SW 35 configured to switch over signals from 10 G multiplexer 32A, a 40 G multiplexer 33A, and a 100 G multiplexer 34A in a predetermined unit to connect between processors. The controller 6 detects an input frame inputted into the 10 G multiplexer 32A, the 40 G multiplexer 33A, or the 100 G multiplexer 34A. Upon detecting an input frame, the controller 6 controls the transmission-side SW 35 based on the MSI value for each of TS numbers of the input frame so as to connect to the 10 G multiplexer 32A, 40 G multiplexer 33A or the 100 G multiplexer 34A, whichever corresponds to the output frame generated by multiplexing the input frame to be inputted. Unlike conventional techniques, the multiplexing device 5 does not have to have one 100 G multiplexer, two 40 G multiplexers, eighteen 10 G multiplexers, and two hundred and eighty-eight 1 G multiplexers according to the combination pattern of ODU. That is, in response to a switching operation of the transmission-side SW 35, the multiplexing device 5 enables connection among processors by switching over, in a predetermined unit, signals from one 100 G multiplexer 34A, two 40 G multiplexers 33A, ten 10 G multiplexers 32A, and eighty 1 G processors 31, and thereby reduces the number of nG processors involved in the multiplexing to a minimum. Thus, the circuit scale can be reduced by reducing the number of implemented circuits, and thereby power consumption can be reduced.

As extracting a MSI value for each of TS numbers of an input frame of each of multiplexers, the multiplexing device 5 can identify and select a multiplexer corresponding to a frame multiplexed and outputted from the input frame.

Although the hitless processing is described in the above embodiment by applying to the demultiplexing device 4, a similar effect can be obtained by applying to the multiplexing device 5. That is, the multiplexing device 5 compares a previous MSI value and a current MSI value with each other for each of TS numbers in response to the detection trigger of the MSI value, and when there is a deleted previous MSI value, deletes the sorting information of the deleted MSI value while holding the sorting information of MSI values same as previous MSI values. The multiplexing device 5 deletes the sorting information corresponding to the deleted MSI value while holding the connecting state to an nG processor related to the sorting information corresponding to MSI values same as previous MSI values. Thus, hitless data communication is ensured.

Further, when there is a MSI value newly added on this occasion, the multiplexing device 5 newly registers the sorting information of the newly added MSI value by adding into free spaces of the TS numbers in the ascending order in the management table 7 while holding the sorting information of MSI values same as previous MSI values. The multiplexing device 5 performs switching operation of an nG processor related to the sorting information corresponding to the newly added MSI value while holding the connecting state to an nG processor related to the sorting information corresponding to MSI values same as previous MSI values. Thus, hitless data communication is ensured while suppressing switching operation to a minimum.

The hitless processing illustrated in FIG. 13 determines in the operation S16 whether there is a MSI value deleted, and when there is no MSI value deleted, determines in the operation S18 whether there is a MSI value added. However, the hitless processing may first determine whether there is a MSI value added, and when there is no MSI value added, then determine whether there is a MSI value deleted.

In FIG. 10 to FIG. 12, the hitless processing is described by using examples of allocating 10 G frames #1 to #10 to #1 to #10 10 G processors 13. However, the hitless processing also may be applied when allocating 40 G frames 190 1 and #2 to #1 and #2 40 G processors 12, and 1 G frames #1 to #80 to #1 to #80 1 G processors 14.

Although the transmission apparatus 1 is described by exemplifying an OTU with LO-ODU multiplexed in the nested two stages, the nest structure is not limited to the two stages, and, for example, the transmission apparatus 1 also applies to an OTU with ODU multiplexed in nested multiple stages of three or more stages.

Although the transmission apparatus 1 multiplexes HO-ODUs storing LO-ODUs by nesting to multiple stages, the ODU combination pattern may be changed as appropriate.

Although the demultiplexing device 4 is configured such that an nG processor extracts a MSI value for each of TS numbers from an input frame, the MSI value may be fixed by manual setting. Although the multiplexing device 5 is configured such that an nG processor extracts a MSI value for each of TS numbers from an input frame, the MSI value may be fixed by manual setting.

Although the above embodiment is described by exemplifying the transmission apparatus 1 which demultiplexes and multiplexes ODU of OTN, a transmission apparatus other than OTN may be applied if the device uses a multistage mode which multiplexes lower-level data by nesting at multiple stages.

Illustrated components may not be physically configured in the same manner as illustrated. That is, specific separation and integration of devices are not limited to those illustrated, and devices may be configured by functionally or physically separating and/or integrating a whole or a portion thereof on an optional basis depending on various loads and utilization status.

Further, various processing functions performed by respective devices may be performed as a whole or in a desired part thereof on a central processing unit (CPU) (or a microcomputer such as a micro processing unit (MPU) and a micro controller unit (MCU)). It goes without saying that various processing functions may be implemented, as a whole or in a desired part, on a program which analyzes and runs on a CPU (or a microcomputer such as a MPU and MCU), or on a hardware by a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A demultiplexing device comprising:
    a first demultiplexer configured to demultiplex a first input signal having a first data rate;
    a second demultiplexer configured to demultiplex a second input signal having a second data rate that is different than the first data rate; and
    a switching circuit configured to set an input destination of signals demultiplexed and output by one of the first demultiplexer and the second demultiplexer to the other one of the first demultiplexer and the second demultiplexer, based on whether the first data rate is higher than the second data rate or the second data rate is higher than the first data rate.

2. The demultiplexing device according to claim 1, further comprising:
    an extraction circuit configured to extract configuration information indicating the configuration of each of the first input signal and the second input signal from each of the first input signal and the second input signal.

3. The demultiplexing device according to claim 2, further comprising:
    a storage in which connection information indicating the input destination and configuration information indicating configuration of each of the first input signal and the second input signal are stored in association with each other,
    wherein the configuration information extracted from each of the first input signal and the second input signal and configuration information stored in the storage unit are compared with each other, and
    wherein, when a part of the extracted configuration information is different from a part of the stored configuration information, the connection information is updated at a part related to a different part of the compared configuration information while being kept unchanged at a part related to a remaining unchanged part of the compared configuration information.

4. A multiplexing device comprising:
    a first multiplexer configured to multiplex a first input signal having a first data rate;
    a second multiplexer configured to multiplex a second input signal having a second data rate that is different than the first data rate; and
    a switching circuit configured to set an input destination of signals multiplexed and output by one of the first multiplexer and the second multiplexer to the other one of the first multiplexer and the second multiplexer, based on whether the first data rate is higher than the second data rate or the second data rate is higher than the first data rate.

5. A demultiplexing method by a demultiplexing device including a first demultiplexer configured to demultiplex a first input signal having a first data rate and a second demultiplexer configured to demultiplex a second input signal having a second data rate that is different than the first data rate, the demultiplexing method comprising:
    setting an input destination of signals demultiplexed and output by one of the first demultiplexer and the second demultiplexer to the other one of the first demultiplexer and the second demultiplexer, based on whether the first data rate is higher than the second data rate or the second data rate is higher than the first data rate.

* * * * *